（12） United States Patent
Ito et al.

(10) Patent No.: US 10,171,736 B2
(45) Date of Patent: Jan. 1, 2019

(54) CONTROL AN IMAGING MODE OF AN IMAGING DEVICE BASED ON POSTURE INFORMATION OF THE IMAGING DEVICE

(71) Applicant: SONY CORPORATION, Tokyo (JP)

(72) Inventors: Ryogo Ito, Tokyo (JP); Kazuma Akamatsu, Tokyo (JP); Shunsuke Katsumata, Kanagawa (JP); Shiro Eshita, Tokyo (JP); Megumi Takagi, Kanagawa (JP); Ayumi Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/025,792

(22) PCT Filed: Sep. 25, 2014

(86) PCT No.: PCT/JP2014/075416
§ 371 (c)(1),
(2) Date: Mar. 29, 2016

(87) PCT Pub. No.: WO2015/076016
PCT Pub. Date: May 28, 2015

(65) Prior Publication Data
US 2016/0269635 A1    Sep. 15, 2016

(30) Foreign Application Priority Data

Nov. 19, 2013    (JP) .................................. 2013-238427

(51) Int. Cl.
*H04N 5/232* (2006.01)
*G03B 17/02* (2006.01)
*G06T 7/70* (2017.01)

(52) U.S. Cl.
CPC ......... *H04N 5/23245* (2013.01); *G03B 17/02* (2013.01); *G06T 7/70* (2017.01);
(Continued)

(58) Field of Classification Search
CPC .................................................. H04N 5/23203
See application file for complete search history.

(56) References Cited

U.S. PATENT DOCUMENTS

| 6,101,339 A * | 8/2000 | Miki | ........................ | G03B 7/26 |
| | | | | 348/372 |
| 7,508,442 B2 | 3/2009 | Watanabe et al. | | |

(Continued)

FOREIGN PATENT DOCUMENTS

JP    2004-080519 A    3/2004

OTHER PUBLICATIONS

Extended European Search Report of EP Patent Application No. 14864600.3, dated Apr. 20, 2017, 9 pages.

(Continued)

*Primary Examiner* — Gary C Vieaux
(74) *Attorney, Agent, or Firm* — Chip Law Group

(57) ABSTRACT

A control unit 15 is provided at an imaging system 10. The control unit 15 controls a mode relating to imaging of an imaging apparatus according to posture determination information indicating at least posture of the imaging apparatus in a separation state between a fixation state in which the imaging apparatus and an information processing apparatus are fixed to each other and the separation state in which the imaging apparatus is separated from the information processing apparatus. For example, when a fixation/separation determining unit 91 of the imaging apparatus 20 determines that the imaging apparatus 20 and the information processing apparatus 60 are in the separation state, a control unit 45 controls the mode relating to imaging of the imaging apparatus 20 according to the posture determination information indicating the posture of the imaging apparatus 20. When the fixation/separation determining unit 91 of the information processing apparatus 60 determines that the imaging apparatus 20 and the information processing apparatus 60 are in (Continued)

the separation state, a control unit 85 controls the mode relating to imaging of the imaging apparatus 20 according to the posture determination information indicating the posture of the imaging apparatus 20. It is possible to easily set the mode relating to imaging.

21 Claims, 13 Drawing Sheets

(52) U.S. Cl.
CPC ..... *H04N 5/23203* (2013.01); *H04N 5/23209* (2013.01); *H04N 5/23222* (2013.01); *G06T 2207/30244* (2013.01)

(56) References Cited

U.S. PATENT DOCUMENTS

| | | | |
|---|---|---|---|
| 7,957,765 | B1 | 6/2011 | Causey et al. |
| 8,223,241 | B2* | 7/2012 | Gayer .................... G03B 17/20 348/333.01 |
| 9,568,806 | B2* | 2/2017 | Kim .................... H04N 5/2254 |
| 2001/0050720 | A1 | 12/2001 | Karube et al. |
| 2003/0063208 | A1 | 4/2003 | Kazami |
| 2005/0134689 | A1* | 6/2005 | Hatanaka ........... H04N 1/00204 348/207.1 |
| 2005/0270277 | A1* | 12/2005 | Park ....................... G06F 1/162 345/173 |
| 2007/0260727 | A1* | 11/2007 | Kutaragi ............. H04L 12/2823 709/224 |
| 2012/0086825 | A1* | 4/2012 | Yost ................... H04N 5/23222 348/216.1 |
| 2013/0242120 | A1* | 9/2013 | Venkatraman ......... H04N 5/225 348/208.4 |
| 2015/0084840 | A1* | 3/2015 | Kim .................... G02B 27/017 345/8 |

OTHER PUBLICATIONS

Zach Honig, "Sony Cyber-Shot QX10 review: A WiFi 'lens camera' that mounts Directly on your smartphone", KP008183638, Internet Citation, Sep. 18, 2013, 13 pages.

Office Action for CN Patent Application No. 201480062014.4, dated Aug. 27, 2018, 08 pages of Office Action and 11 pages of English Translation.

* cited by examiner

FIG. 2
(A) 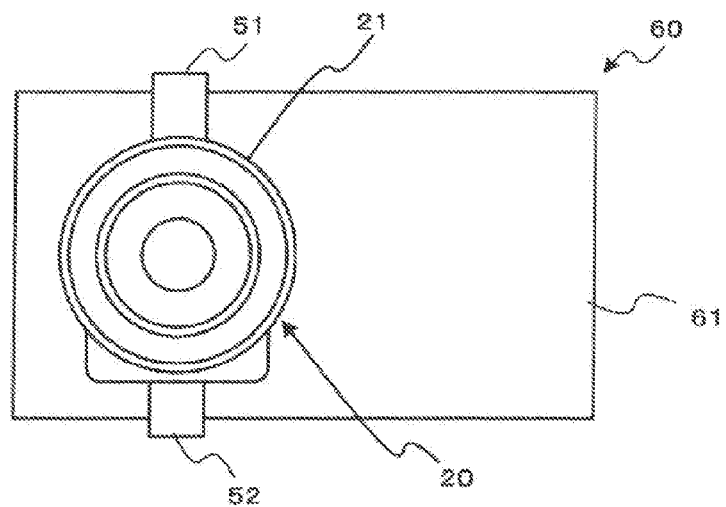
(B) 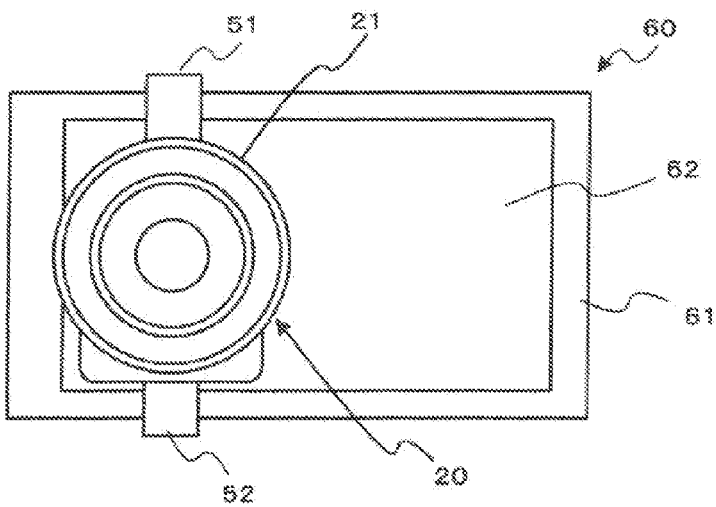

FIG. 4
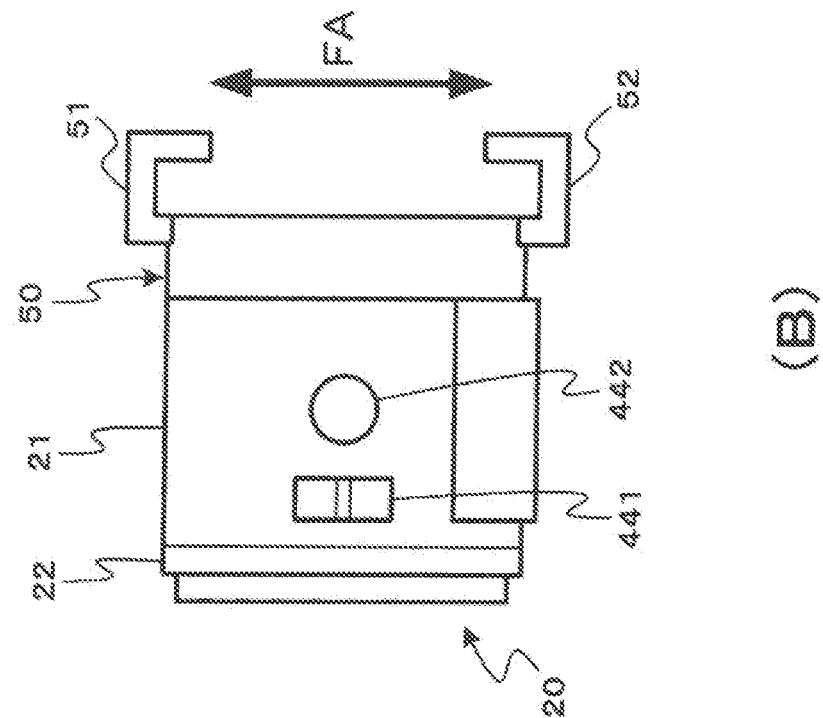
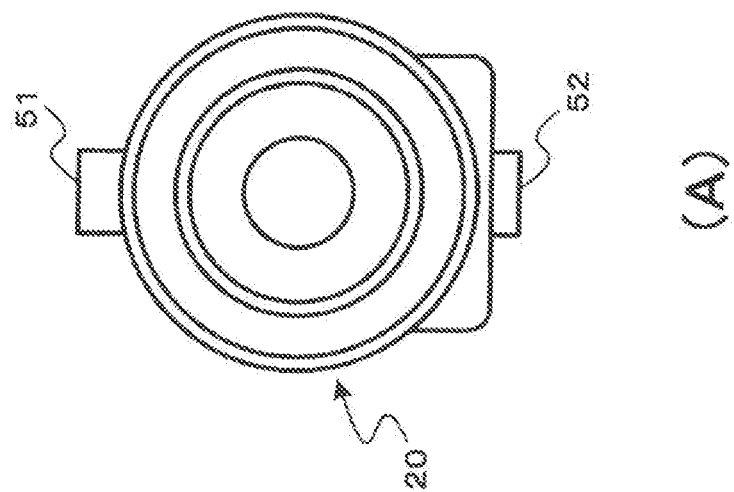

CONTROL AN IMAGING MODE OF AN IMAGING DEVICE BASED ON POSTURE INFORMATION OF THE IMAGING DEVICE

TECHNICAL FIELD

The present technology relates to an imaging system, an imaging apparatus, an information processing apparatus and method, and a program, and enables a mode relating to imaging to be easily set.

BACKGROUND ART

In related art, an imaging apparatus such as a digital still camera and a digital video camera which picks up an image of a subject to generate image data and records this image data as content has been spread. Further, in accordance with spread of an information processing apparatus (such as, for example, a smartphone) which exchanges various kinds of data by utilizing radio communication, it has been proposed to remotely and wirelessly operate an imaging apparatus from a distant location using the information processing apparatus (see, for example, Patent Literature 1).

CITATION LIST

Patent Literature

Patent Literature 1: JP 2012-186698A

SUMMARY OF INVENTION

Technical Problem

By the way, when a mode relating to imaging of an imaging apparatus is set, a user is required to perform troublesome operation for, for example, setting a mode to a desired mode at the imaging apparatus or at an information processing apparatus connected through communication. Therefore, it is desirable to easily set the mode of the imaging apparatus to the desired mode.

Therefore, there is a need for providing an imaging system, an imaging apparatus, an information processing apparatus and method, and a program which enable a mode relating to imaging to be easily set.

Solution to Problem

A first aspect of the present technology resides in an imaging system including; a control unit configured to control a mode relating to imaging of an imaging apparatus according to posture determination information indicating at least posture of the imaging apparatus in a separation state between a fixation state in which the imaging apparatus and an information processing apparatus are fixed to each other and the separation state in which the imaging apparatus is separated from the information processing apparatus.

In the imaging system according to the present technology, the imaging apparatus which, for example, does not have a function for displaying a picked up image performs communication with the information processing apparatus which has an image display function, so that a picked up image generated at the imaging apparatus is displayed at a display unit of the information processing apparatus. The imaging apparatus and the information processing apparatus are switchable between a fixation state in which the imaging apparatus and the information processing apparatus are fixed to each other and a separation state in which the imaging apparatus and the information processing apparatus are separated from each other, and a fixation/separation determining unit determines whether the imaging apparatus and the information processing apparatus are in the fixation state or the separation state. Further, a posture determining unit determines posture of the imaging apparatus, so that the mode relating to imaging of the imaging apparatus is controlled according to posture determination information indicating at least the posture of the imaging apparatus in the separation state in which the imaging apparatus is separated from the information processing apparatus. In the control of the mode relating to imaging, a mode preset by the user is selected according to the posture determination information. For example, when it is determined based on the posture determination information that the posture is continuously maintained for a predetermined period, and, when the posture determination information indicates that an imaging direction is upward, control is performed so that the mode relating to imaging of the imaging apparatus is made a mode appropriate for imaging night sky. Further, when the posture determination information indicates that the imaging direction is downward, control is performed so that the mode relating to imaging of the imaging apparatus is made a miniature mode. Still further, when the posture determination information indicates that the imaging direction is a direction of user him/herself, control is performed so that the mode relating to imaging of the imaging apparatus is made a self-capturing mode. In the self-capturing mode, a picked up image which is mirror-reversed is displayed at a display unit of the information processing apparatus. Further, the mode relating to imaging is set while taking into account a holding aspect of the imaging apparatus which is put into the separation state. Still further, when it is determined that the imaging apparatus and the information processing apparatus are in the fixation state, control of the mode relating to imaging of the imaging apparatus according to the posture determination information is not performed.

A second aspect of the present technology resides in an imaging control method including: a step of controlling a mode relating to imaging of an imaging apparatus according to posture determination information indicating at least posture of the imaging apparatus in a separation state between a fixation state in which the imaging apparatus and an information processing apparatus are fixed to each other and the separation state in which the imaging apparatus is separated from the information processing apparatus.

A third aspect of the present technology resides in a program causing a computer to execute control of a mode relating to imaging of an imaging apparatus, the program causing the computer to execute: a procedure of controlling the mode relating to imaging of the imaging apparatus according to posture determination information indicating at least posture of the imaging apparatus in a separation state between a fixation state in which the imaging apparatus and an information processing apparatus are fixed to each other and the separation state in which the imaging apparatus is separated from the information processing apparatus.

It should be noted that the program according to the present technology is a program which can be provided to, for example, a general-purpose computer which can execute various program codes using a storage medium which provides the program in a computer-readable form, a communication medium, for example, a storage medium such as an optical disc, a magnetic disc and a semiconductor memory, or a communication medium such as a network. By providing such a program in a computer-readable form, processing according to the program can be implemented on the computer.

A fourth aspect of the present technology resides in an imaging apparatus including: a control unit configured to control a mode relating to imaging according to posture determination information indicating at least posture of the imaging apparatus in a separation state between a fixation state in which the imaging apparatus is fixed to an information processing apparatus and the separation state in which the imaging apparatus is separated from the information processing apparatus.

A fifth aspect of the present technology resides in an information processing apparatus including: a communication unit configured to perform communication with an imaging apparatus; and a control unit configured to control a mode relating to imaging of the imaging apparatus via the communication unit according to posture determination information indicating at least posture of the imaging apparatus in a separation state between a fixation state in which the information processing apparatus is fixed to the imaging apparatus and the separation state in which the information processing apparatus is separated from the imaging apparatus.

Advantageous Effects of Invention

According to the present technology, the mode relating to imaging of an imaging apparatus is controlled according to posture determination information indicating at least posture of the imaging apparatus in a separation state between a fixation state in which the imaging apparatus and an information processing apparatus are fixed to each other and the separation state in which the imaging apparatus is separated from the information processing apparatus. Therefore, because the mode is set according to the posture determination information indicating at least the posture of the imaging apparatus in the separation state without troublesome operation for setting a mode being performed at the imaging apparatus or the information processing apparatus, the mode relating to imaging can be easily set. It should be noted that the advantageous effects described in the present specification are described merely as examples and not by way of limitation, and may include additional advantageous effects.

BRIEF DESCRIPTION OF DRAWINGS

FIG. 2 is a diagram illustrating appearance of the imaging system.

FIG. 4 is a diagram illustrating appearance of an imaging apparatus.

DESCRIPTION OF EMBODIMENTS

An embodiment for implementing the present technology will be described below. It should be noted that the description will be provided in the following order.
1. Functional Configuration of Imaging System
2. Appearance of Imaging System
3. Functional Configuration of Imaging apparatus
4. Functional Configuration of Information Processing Apparatus
5. Operation of Imaging System
5-1. Collaboration between Imaging Apparatus and Information Processing Apparatus
5-2. Operation of Controlling Mode Relating to Imaging
5-2-1. First Control Operation
5-2-2. Second Control Operation <1. Functional Configuration of Imaging System>

Figure 1:
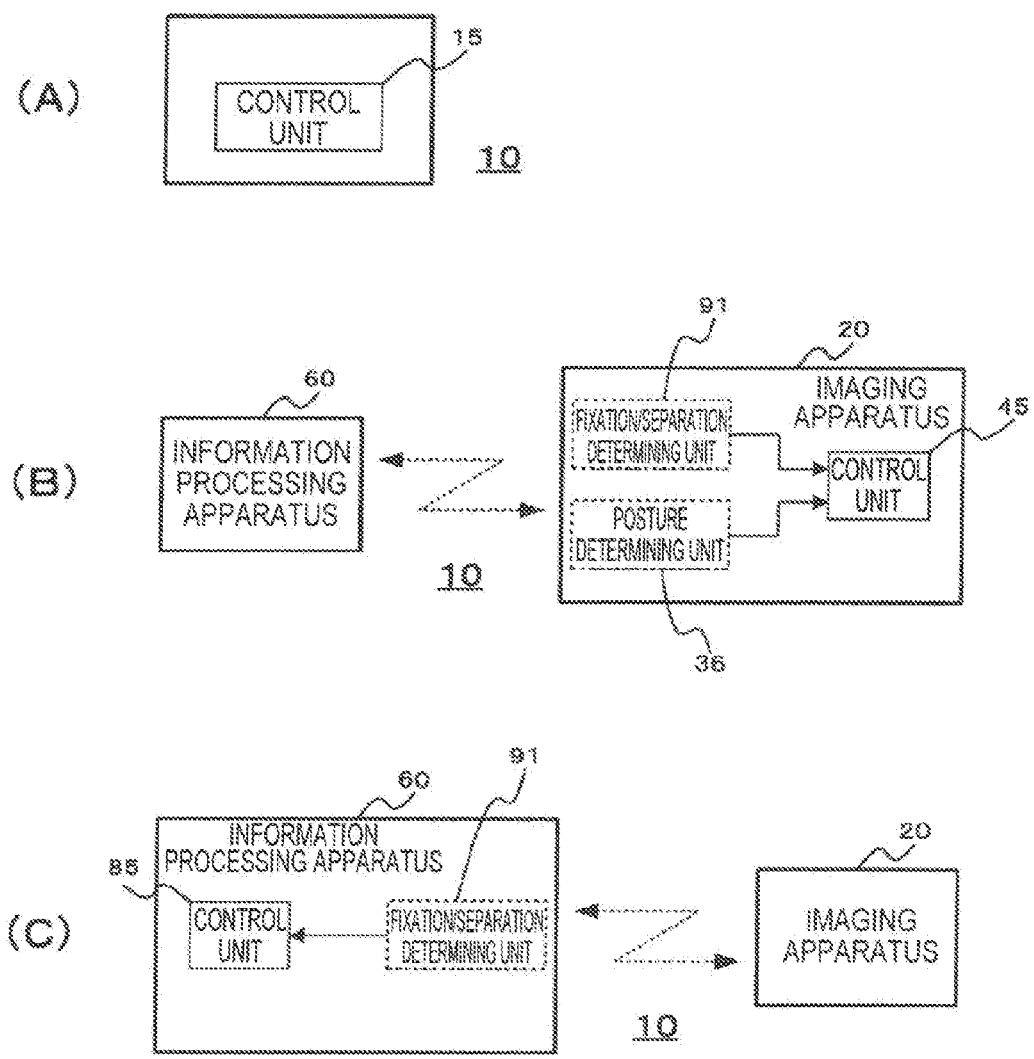
FIG. 1 is a diagram illustrating a functional configuration of an imaging system.

FIG. 1 illustrates a functional configuration of an imaging system 10 according to the present technology. The imaging system 10 includes a control unit 15 as illustrated in FIG. 1(A). The control unit 15 has a function of controlling a mode relating to imaging of an imaging apparatus according to posture determination information indicating at least posture of the imaging apparatus in a separation state between a fixation state in which the imaging apparatus and an information processing apparatus are fixed to each other and the separation state in which the imaging apparatus is separated from the information processing apparatus. In the imaging system 10, the control unit 15 may be provided at the imaging apparatus or may be provided at the information processing apparatus. Further, the control unit 15 may be provided at an adapter used for fixing the imaging apparatus and the information processing apparatus to each other. For example, FIG. 1(B) illustrates the imaging system 10 in the case where a control unit 45 which controls operation of the imaging apparatus 20 has a function of controlling the mode relating to imaging. Further, for example, FIG. 1(C) illustrates the imaging system 10 in the case where a control unit 85 which controls operation of the information processing apparatus 60 has a function of controlling the mode relating to imaging. It should be noted that the imaging system 10 illustrated in FIG. 1(A) corresponds to an imaging control apparatus having a function of controlling the mode relating to imaging, while the imaging system 10 illustrated in FIG. 1(B) corresponds to a case where the imaging control apparatus is provided at the imaging apparatus 20. Further, the imaging system 10 illustrated in FIG. 1(C) corresponds to a case where the imaging control apparatus is provided at the information processing apparatus 60.

Further, at the imaging system, a fixation/separation determining unit configured to determine whether the imaging apparatus and the information processing apparatus are in a fixation state or a separation state and output fixation/separation information may be provided. For example, as illustrated in FIG. 1(B), a fixation/separation determining unit 91 may be provided at the imaging apparatus 20, or, as illustrated in FIG. 1(C), the fixation/separation determining unit 91 may be provided at the information processing apparatus 60. Further, a posture determining unit configured to determine the posture of the imaging apparatus and output the posture determination information may be provided at the imaging system. For example, as illustrated in FIG. 1(B), a posture determining unit 36 may be provided at the imaging apparatus 20. Further, the fixation/separation determining unit 91 may be provided at an apparatus different from an apparatus having a control unit which has a function of controlling a mode relating to imaging. For example, as in the imaging system 10 illustrated in FIG. 1(B), when the control unit 45 of the imaging apparatus 20 has a function of controlling a mode, the fixation/separation determining unit 91 may be provided at the information processing apparatus 60. Further, although not illustrated, the control unit, and the fixation/separation determining unit may be provided separately from the imaging apparatus 20 and the information processing apparatus 60.

The imaging apparatus 20 is configured to be able to select a plurality of modes so as to be able to easily generate, for example, a desired picked up image (a still image or a moving image). Further, the imaging apparatus 20 has a communication function. The imaging apparatus 20 communicates various kinds of information with the information processing apparatus 60 through, for example, radio communication. Further, while the imaging apparatus 20 does not have a function of displaying a picked up image generated through imaging, the imaging apparatus 20 transmits image information of the picked up image to the information processing apparatus, so that the picked up image is displayed at the information processing apparatus. Further, the imaging apparatus 20 can perform control of a mode relating to imaging, or the like, based on a control signal supplied from the information processing apparatus 60 through communication.

The information processing apparatus 60 is equipment having a display function and a communication function, and, for example, a mobile phone, a smartphone, a tablet terminal, a laptop computer, or the like, can be used as the information processing apparatus. The information processing apparatus 60 processes information supplied from the imaging apparatus 20 through, for example, radio communication. For example, the information processing apparatus 60 displays a picked up image based on image information supplied from the imaging apparatus 20. Further, when the information processing apparatus 60 performs control of a mode relating to imaging at the imaging apparatus 20, or the like, the information processing apparatus 60 generates a control signal for controlling the imaging apparatus 20 and transmits the control signal to the imaging apparatus 20 through communication.

It should be noted that a configuration of the imaging system 10 is not limited to the configuration illustrated in FIG. 1. For example, the imaging system 10 may be the control unit 15 alone, the imaging apparatus 20 alone, the information processing apparatus 60 alone, or a combination thereof.

<2. Appearance of Imaging System>

Figure 3:
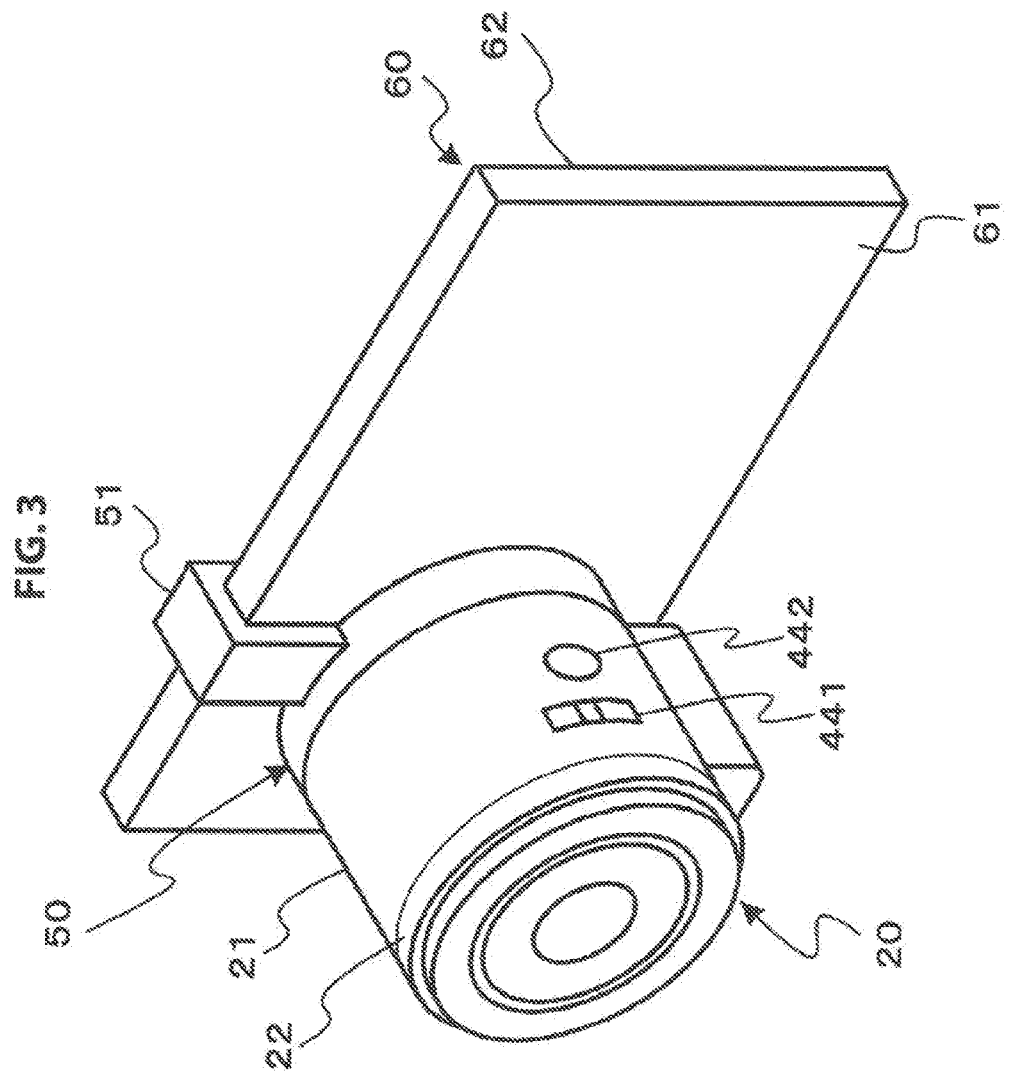
FIG. 3 is a perspective view illustrating the appearance of the imaging system.

FIG. 2 is a diagram illustrating appearance of the imaging system, and FIG. 3 is a perspective view illustrating appearance of the imaging system. FIG. 4 is a diagram illustrating appearance of the imaging apparatus. It should be noted that in FIG. 2 and FIG. 3, for example, a smartphone is used as the information processing apparatus.

Although not illustrated, the imaging apparatus 20 has an optical imaging system, an imaging unit, a signal processing unit, a communication unit, a control unit, or the like, inside a cylindrical portion 21 formed in a cylindrical shape. An annular control ring 22 is provided at an anterior end portion of the cylindrical portion 21. It should be noted that the optical imaging system may be an interchangeable lens. The imaging apparatus 20 changes a focus position or a zoom position in accordance with rotation of the control ring 22. Therefore, by using the control ring 22, it is possible to realize manual operation of focus adjustment, or the like. Further, a zoom button 441 and a shutter button 442 are provided at a side face of the cylindrical portion 21. The imaging apparatus 20 changes the zoom position toward a wide angle side or toward a telephoto side in accordance with operation of the zoom button 441. Further, when the imaging apparatus 20 is put in a still image mode, the imaging apparatus 20 performs processing of recording a still image at the time the shutter button 442 is manipulated by a user in a recording medium. Further, when the imaging apparatus 20 is put in a moving image pickup mode, the imaging apparatus 20 starts or finishes recording of a moving image according to operation of the shutter button 442.

Although not illustrated, the information processing apparatus 60 has a signal processing unit, a communication unit, a control unit, or the like, inside a chassis 61 formed in a chassis form having a substantially rectangular shape. Further, a display panel 62 is provided on one face (front face) of the chassis 61. The display panel 62 is configured using a touch panel, and various kinds of functions are executed by each predetermined position of the display panel 62 being manipulated.

An attachment mechanism portion 50 for integrally attaching the imaging apparatus 20 and the information processing apparatus 60 is provided at the imaging apparatus 20. Attachment members 51 and 52 are provided at the attachment mechanism portion 50, and are configured to be able to move in an arrow FA direction as illustrated in FIG. 4. The user integrally fixes the imaging apparatus 20 to the information processing apparatus 60 by moving the attachment members 51 and 52 in the arrow FA direction according to a shape, a size, or the like, of the information processing apparatus 60 and locking the attachment members 51 and 52 to the chassis 61 of the information processing apparatus 60. It should be noted that FIG. 2(A) illustrates a state in which the imaging apparatus 20 is integrally fixed on a back side of the information processing apparatus 60, while FIG. 2(B) illustrates a state in which the imaging apparatus 20 is integrally fixed on a front side (the display panel 62 side) of the information processing apparatus 60. Further, the user separates the imaging apparatus 20 from the information processing apparatus 60 by moving the attachment members 51 and 52 locked to the chassis 61 of the information processing apparatus 60 in a direction opposite to a locking direction.

It should be noted that the configuration of the attachment mechanism portion 50 is not limited to the configuration in which the attachment mechanism portion 50 is integrally configured with the imaging apparatus 20, and the attachment mechanism portion 50 may be configured separately from the imaging apparatus 20 as an adapter for integrally attaching the imaging apparatus 20 and the information processing apparatus 60.

<3. Functional Configuration of Imaging Apparatus>

Figure 5:
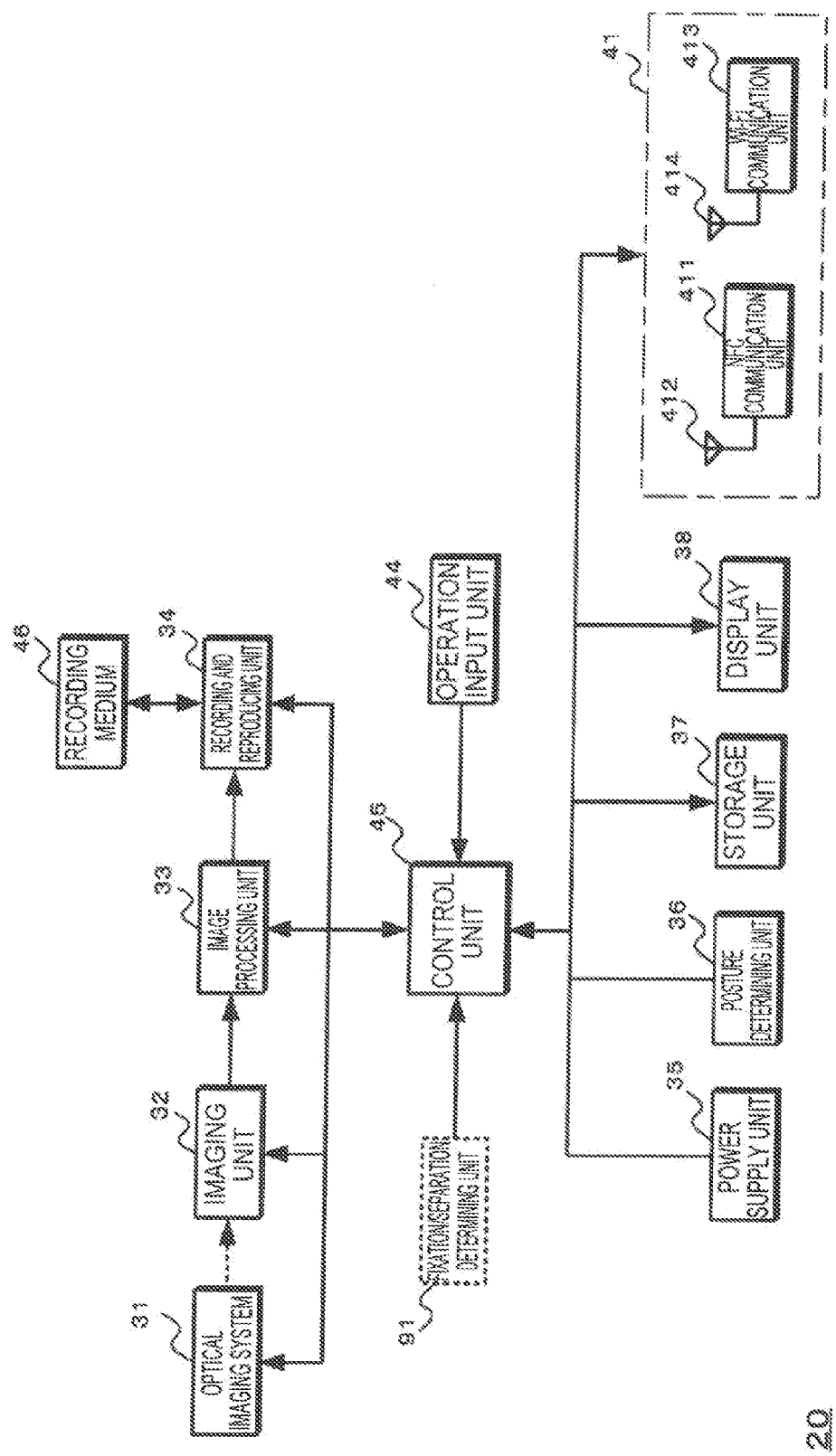
FIG. 5 is a block diagram illustrating a functional configuration of the imaging apparatus.

A functional configuration of the imaging apparatus will be described next. FIG. 5 is a block diagram illustrating the functional configuration of the imaging apparatus.

The imaging apparatus 20 includes an optical imaging system 31, an imaging unit 32, an image processing unit 33, a recording and reproducing unit 34, a power supply unit 35, a posture determining unit 36, a storage unit 37, a display unit 38, a radio communication unit 41, an operation input unit 44 and a control unit 45. Further, a recording medium 46 is provided at the imaging apparatus 20. The recording medium 46 may be fixed at the imaging apparatus 20 or may be provided so as to be able to be incorporated into the imaging apparatus 20.

The optical imaging system 31 has a lens group including a focus lens, a zoom lens, or the like, a diaphragm adjusting mechanism, and a driving unit configured to drive the lens group and the diaphragm adjusting mechanism. Further, the optical imaging system 31 may have an optical shutter mechanism, a camera-shake correcting mechanism, or the like.

The imaging unit 32 is configured using an imaging device such as a charge coupled device (CCD) and a complementary metal oxide semiconductor (CMOS). The imaging unit 32 converts a subject optical image formed by the optical imaging system 31 into an image signal. The imaging unit 32 outputs the image signal generated through photoelectric conversion to the image processing unit 33.

The image processing unit 33 performs various kinds of signal processing, or the like, on the image signal outputted from the imaging unit 32. For example, the image processing unit 33 performs noise removal, color compensation, edge detection, or thee like, as necessary. The image processing unit 33 outputs the processed image signal to the recording and reproducing unit 34.

The recording and reproducing unit 34 records a picked up image and reproduces the recorded picked up image using the recording medium 46. The recording and reproducing unit 34 records an image signal of a still image or a moving image generated at the imaging unit 32 and processed at the image processing unit 33 in the recording medium 46. Further, the recording and reproducing unit 34 reproduces the still image or the moving image recorded in the recording medium 46 and reads out the image signal. It should be noted that the recording and reproducing unit 34 may record an image signal before being processed at the image processing unit 33 in the recording medium 46. Further, the recording and reproducing unit 34 may perform encoding processing for compressing a signal amount of an image signal to be recorded in the recording medium 46 and processing of decoding encoded data recorded in the recording medium 46.

The power supply unit 35 is configured with a battery and a power supply circuit. The power supply unit 35 supplies power to each unit of the imaging apparatus 20 according to a control signal outputted from the control unit 45.

The posture determining unit 36 performs posture determination processing of the imaging apparatus 20. The posture determining unit 36 which is configured using a sensor such as a triaxial acceleration sensor, a gyro sensor and an inclination sensor, determines the posture or a posture change of the imaging apparatus 20 with respect to a vertical direction or a horizontal direction of the imaging apparatus, a rotational direction around the optical axis of the optical imaging system 31, or the like. The posture determining unit 36 outputs the posture determination information indicating a posture determination result to the control unit 45. Further, if the posture determination information is outputted to the information processing apparatus 60 along with image information of a picked up image, it is possible to display the picked up image at the information processing apparatus while taking into account the posture, or the like, of the imaging apparatus 20. For example, when a picked up image is generated while the imaging apparatus 20 is inclined with respect to the horizontal direction, the image is displayed at the information processing apparatus 60 after the inclination of the imaging apparatus 20 is corrected based on the posture determination information. By displaying an image in this manner, it is possible to prevent a subject which is not inclined with respect to the horizontal direction from being displayed while the subject in the image is inclined. It should be noted that, for example, a global positioning system (GPS) positioning module, or the like, which is a sensor for detecting a current location, or, for example, a geomagnetic sensor, or the like, which is a sensor for detecting orientation in the imaging direction, or the like, may be provided at the posture determining unit 36.

The storage unit 37 is a recording medium such as a random access memory (RAM) and a read only memory (ROM). The RAM is utilized as, for example, a work area of the control unit 45. Further, for example, a program, or the like, for executing various control at the control unit 45 is stored in the ROM. Further, control information, or the like, used to perform various control at the control unit 45 is stored in the ROM or the RAM.

The display unit 38 is configured using, for example, a liquid crystal display device, or the like, and displays a setting state or an operation state of the imaging apparatus 20.

The radio communication unit 41 includes a near field communication (NFC) communication unit 411, an NFC antenna 412, a Wi-Fi communication unit 413 and a Wi-Fi antenna 414.

The NFC communication unit 411 is an interface for performing non-contact communication with an external apparatus (for example, the information processing apparatus 60) near the imaging apparatus 20 while collaborating with the NFC antenna 412 according to control by the control unit 45. The NFC communication unit 411 transmits a radio wave reaching a short distance of approximately 3 cm to 10 cm or approximately 7 mm depending on design from the NFC antenna 412 to perform NFC communication with the external apparatus included within a radio wave range. The NFC communication unit 411 transmits, for example, connection information (Wi-Fi configuration) for automatically connecting to Wi-Fi and an android application record (AAR) according to a check command from the external apparatus. The connection information includes a service set identifier (SSID) for Wi-Fi connection, a pass key (encryption key), or the like.

The Wi-Fi communication unit 413 is an interface for performing radio communication with an external apparatus (for example, the information processing apparatus 60) around the imaging apparatus 20 while collaborating with the Wi-Fi antenna 414 according to control by the control unit 45. The Wi-Fi communication unit 413 performs processing of establishing Wi-Fi communication connection with the external apparatus by performing Wi-Fi authentication in response to, for example, a Wi-Fi connection request from the external apparatus.

The operation input unit 44 detects operation input by the user and outputs an operation signal according to the user operation to the control unit 45. The operation input unit 44 has the above-described zoom button 441 and shutter button 442, and has a configuration in which functions are assigned in advance to physical switches.

The control unit 45 executes a program recorded in the storage unit 37 and generates a control signal based on the operation signal supplied from the operation input unit 44, control information stored in the storage unit 37, a result of communication with the information processing apparatus 60, the fixation/separation information and the posture determination information, sensor information, or the like. The control unit 45 outputs the generated control signal to each unit and performs imaging control, image processing control, recording and reproducing control, or the like, so that the operation according to the user operation is performed at the imaging apparatus 20. Further, the control unit 45 performs processing of transmitting the image information of the picked up image from the radio communication unit 41 to the information processing apparatus 60 or processing of controlling the operation of the imaging apparatus 20 based on the control signal from the information processing apparatus 60.

The recording medium 46 is a memory card, or the like, in which a picked up image, or the like, is written, and is detachably provided.

It should be noted that when the fixation/separation determining unit 91 is provided at the imaging apparatus 20, the fixation/separation information outputted from the fixation/separation determining unit 91 is outputted to the control unit 85 of the information processing apparatus 60 via the control unit 45 or the radio communication unit 41. Further, the processing at the fixation/separation determining unit 91 may be performed at the control unit 45.

When the fixation/separation determining unit 91 is provided at the imaging apparatus 20, a switch, or the like, for detecting whether the imaging apparatus 20 and the information processing apparatus 60) are in a fixation state or a separation state is provided at the imaging apparatus 20 as the fixation/separation determining unit 91, and a signal generated by this switch is used as the fixation/separation information. For example, when the imaging apparatus 20 can be separated from the attachment mechanism portion 50, a switch is provided at the imaging apparatus 20 as the fixation/separation determining unit 91, the switch being put into an on-state when the attachment mechanism portion 50 is attached to the imaging apparatus 20 and the attachment mechanism portion 50 is further attached to the information processing apparatus 60, and the switch being put into an off-state when any of the imaging apparatus 20 and the information processing apparatus 60 is separated from the attachment mechanism portion 50. Further, a signal generated by this switch is used as the fixation/separation information.

<4. Functional Configuration of Information Processing Apparatus>

Figure 6:
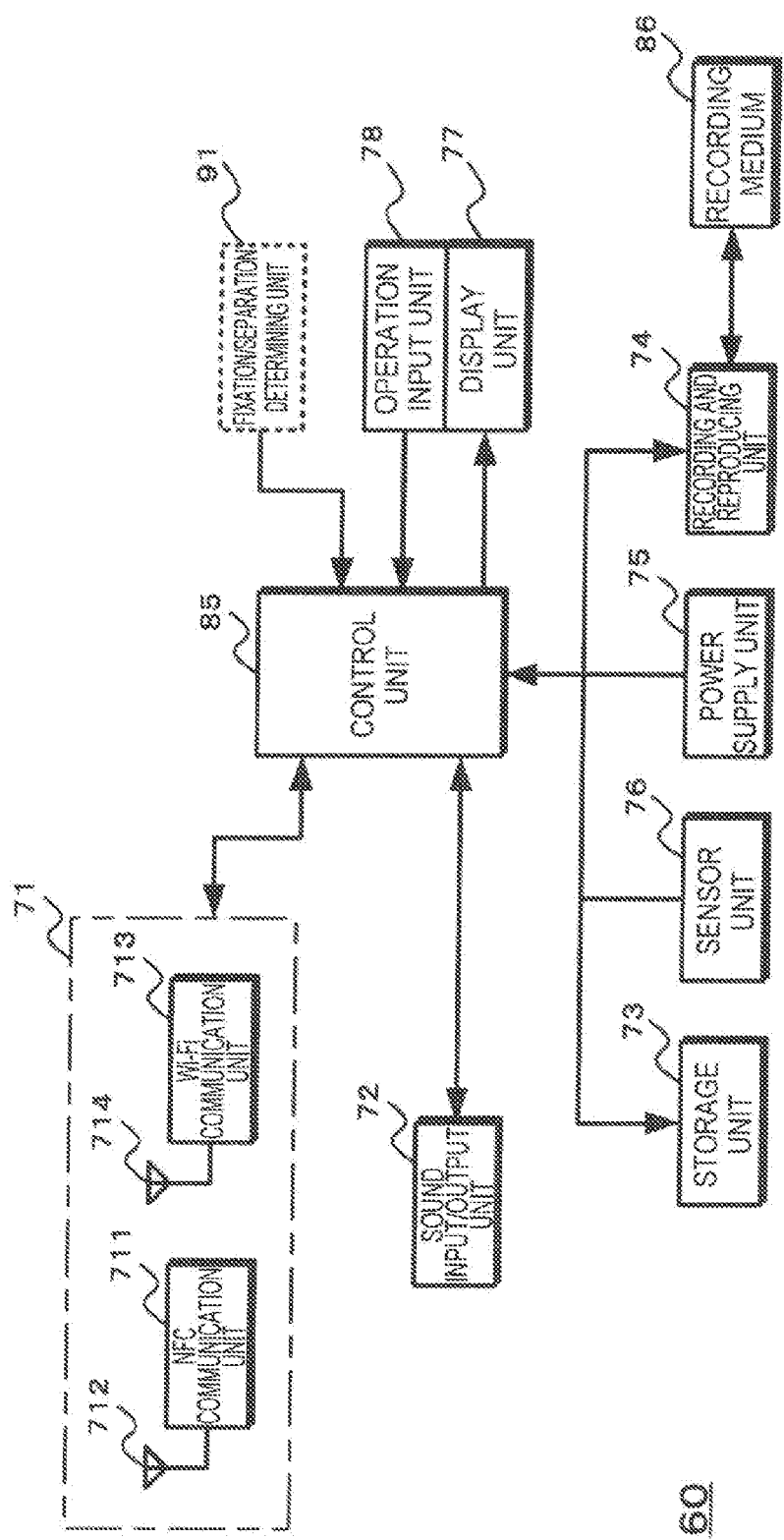
FIG. 6 is a block diagram illustrating a functional configuration of an information processing apparatus (for example, a smartphone).

A functional configuration of the information processing apparatus will be described next. FIG. 6 is a block diagram illustrating the functional configuration of the information processing apparatus (for example, a smartphone).

The information processing apparatus 61 has a radio communication unit 71, a sound input/output unit 72, a storage unit 73, a recording and reproducing unit 74, a power supply unit 75, a sensor unit 76, a display unit 77, an operation input unit 78 and a control unit 85. Further, a recording medium 86 is detachably provided at the information processing apparatus 60.

The radio communication unit 71 includes an NFC communication unit 711, an NFC antenna 712, a Wi-Fi communication unit 713 and a Wi-Fi antenna 714. It should be noted that, although not illustrated, a communication unit complying with communication standards of a cellular phone may be provided at the radio communication unit 71.

The NFC communication unit 711 is an interface performing non-contact communication with an external apparatus (for example, the imaging apparatus 20) near the information processing apparatus 60 while collaborating with the NFC antenna 712. The NFC communication unit 711 performs, for example, NFC communication with the imaging apparatus 20 as described above.

The Wi-Fi communication unit 713 is an interface performing radio communication with an external apparatus (for example, the imaging apparatus 20) around the information processing apparatus 60 while collaborating with the Wi-Fi antenna 714. The Wi-Fi communication unit 713 performs, for example, processing of establishing Wi-Fi communication connection with the imaging apparatus 20 as described above.

The sound input/output unit 72 is configured using a speaker and a microphone. The sound input/output unit 72 inputs/outputs sound of speech conversation performed via the radio communication unit 71. Further, the sound input/output unit 72 outputs reproduced sound of music content or image content recorded in the storage unit 73 or the recording medium 86.

The storage unit 73 is a recording medium such as a random access memory (RAM) and a read only memory (ROM). The RAM is utilized as, for example, a work area of the control unit 85. Further, for example, a program, or the like, for executing various control at the control unit 85 is stored in the ROM. Further, in the ROM and the RAM, control information, or the like, used to perform various control at the control unit 85 is stored. Still further, in the RAM, music content and image content, a program for various kinds of application, a picked up image supplied from the imaging apparatus 20, email information, or the like, can be recorded.

The recording and reproducing unit 74 records various kinds of information and reads out the recorded information using the recording medium 86. The recording and reproducing unit 74 records, for example, music content or image content, a picked up image, email information, address information of others used for radio communication, or the like, in the recording medium 86. Further, the recording and reproducing unit 74 reads out various kinds of information recorded in the recording medium 86.

The power supply unit 75 is configured with a battery and a power supply circuit. The power supply unit 75 supplies power to each unit of the information processing apparatus 60 based on the control signal from the control unit 85.

The sensor unit 76 detects a current location, posture or a posture change, orientation, or the like, of the information processing apparatus 60. The sensor unit 76 is configured using a sensor for detecting the current location, a sensor for detecting the posture or the posture change, and a sensor for detecting the orientation in an imaging direction, or the like, and outputs sensor information indicating detection results to the control unit 85. It should be noted that the sensor unit 76 uses, for example, a global positioning system (GPS) positioning module, or the like, as the sensor for detecting the current location. Further, the sensor unit 76 uses, for example, a triaxial acceleration sensor, an inclination sensor, a gym sensor, or the like, as the sensor for detecting the posture or the posture change, and uses, for example, a geomagnetic sensor, or the like, as the sensor for detecting the orientation in the imaging direction. Further, the sensor unit 76 may be configured to detect at least any of the current location, the posture or the posture change, the orientation, or the like, of the information processing apparatus 60.

The display unit 77 is configured using a display device such as a liquid crystal display, an organic EL display, or the like. The display unit 77 displays a graphical user interface (GUI) screen, characters, images, or the like, according to operation of application by control of the control unit 85.

The operation input unit 78 is configured using an operation switch and a touch panel. The touch panel is provided on a display screen of the display unit 77, and is configured such that functions are assigned according to display of the display screen. The operation input unit 78 generates an operation signal according to the user operation and outputs the operation signal to the control unit 85. It should be noted that the above-described display panel 62 is configured using, for example, the display unit 77 and the operation input unit 78.

The control unit 85 executes a program recorded in the storage unit 73 and generates a control signal based on the operation signal supplied from the operation input unit 78, the control information stored in the storage unit 73, or the like. The control unit 85 outputs the generated control signal to each unit and performs communication control, display control, recording and reproducing control, or the like, so that operation according to the user operation is performed at the information processing apparatus 60. Further, the control unit 85 controls the NFC communication unit 711 and the Wi-Fi communication unit 713 to perform radio communication with the imaging apparatus 20. Further, the control unit 85 performs processing of starting a predetermined application program based on communication with the imaging apparatus 20 and processing of generating a control signal based on the operation signal, the fixation/separation information, or the like, and transmitting the control signal to the imaging apparatus 20 after the program is started. Further, when the posture determination information is outputted to the information processing apparatus 60 along with the image information of the picked up image as described above, the control unit 85 displays the picked up image while taking into account the posture of the imaging apparatus 20 based on the posture determination information. For example, the inclination of the imaging apparatus 20 is corrected, and a subject which is not inclined with respect to the horizontal direction is prevented from being displayed while the subject in the image is inclined.

It should be noted that when the fixation/separation determining unit 91 is provided at the information processing apparatus 60, the fixation/separation information outputted from the fixation/separation determining unit 91 is outputted to the control unit 45 of the imaging apparatus 20 via the control unit 85 or the radio communication unit 71. Further, the processing at the fixation/separation determining unit 91 may be performed at the control unit 85.

Further, when the fixation/separation determining unit 91 is provided at the adapter for fixing the imaging apparatus 20 and the information processing apparatus 60, the fixation/separation determining unit 91 outputs a determination result to the control unit 45 of the imaging apparatus 20 or the control unit 85 of the information processing apparatus 60.

When the fixation/separation determining unit is provided at the information processing apparatus 60, a detection mechanism or a detection function for detecting whether or not the attachment members 51 and 52 of the attachment mechanism portion 50 attached to the imaging apparatus 20 for fixing the imaging apparatus 20 to the information processing apparatus 60 are locked to the information processing apparatus 60 is provided at the information processing apparatus 60 as the fixation/separation determining unit 91. Further, the fixation/separation determining unit 91 uses the detection result of this detection mechanism, or the like, as the fixation/separation information. It should be noted that a switch may be provided at the information processing apparatus 60 as the detection mechanism, or the detection function may be implemented by utilizing the display panel 62. When the fixation/separation determining unit 91 is provided at the attachment mechanism portion 50 which is an adapter, a detection mechanism for detecting whether or not the attachment members for fixing the attachment mechanism portion 50 to which the imaging apparatus 20 is attached, to the information processing apparatus 60 are locked to the information processing apparatus 60 is provided at the attachment mechanism portion 50 as the fixation/separation determining unit 91. The fixation/separation determining unit 91 uses the detection result of this detection mechanism as the fixation/separation information. Further, because the posture change and movement of the imaging apparatus 20 are the same as the posture change and movement of the information processing apparatus 60 when the imaging apparatus 20 and the information processing apparatus 60 are in a fixation state, it is also possible to generate the fixation/separation information by determining whether the imaging apparatus 20 and the information processing apparatus 60 are in a fixation state or a separation state based on a detection result of the posture change and movement.

<5. Operation of Imaging System>

[5-1. Collaboration Between Imaging Apparatus and Information Processing Apparatus]

Figure 7:
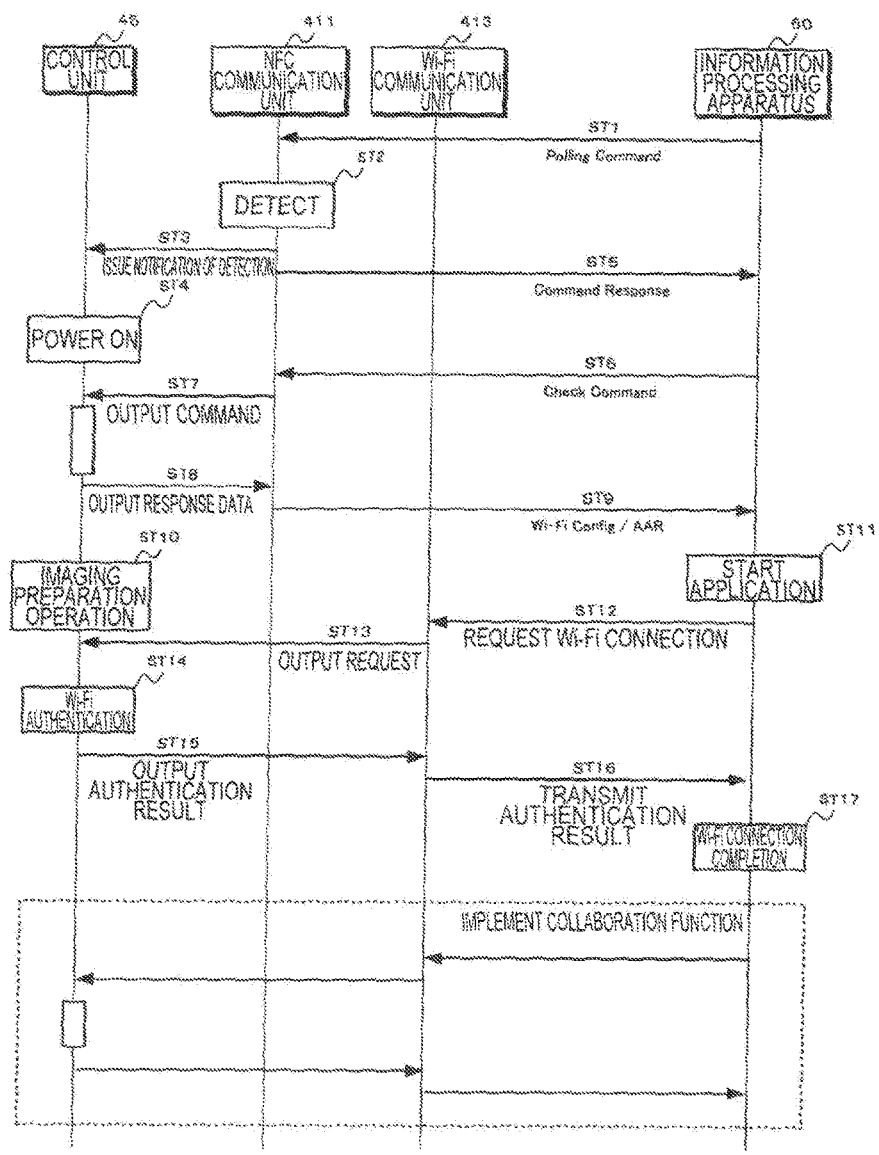
FIG. 7 is a sequence diagram illustrating operation processing until a collaboration function between the imaging apparatus and the information processing apparatus is started.

Operation of the imaging system will be described next. FIG. 7 is a sequence diagram illustrating operation processing until a function of collaboration between the imaging apparatus and the information processing apparatus is started in the imaging system.

In step ST1, the information processing apparatus 60 issues a polling command through NFC communication. Here, when the NFC antenna of the imaging apparatus 20 is included within a predetermined radio wave range from the NFC antenna of the information processing apparatus 60, in step ST2, the NFC communication unit 411 of the imaging apparatus 20 detects issuing of the polling command.

In step ST3, the NFC communication unit 411 of the imaging apparatus 20 notifies the control unit 45 of the detection in response to the detection of the NFC communication from the information processing apparatus 60.

In step ST4, the control unit 45 generates a control signal in response to notification of the detection by the NFC communication unit 411 and outputs the control signal to the power supply unit 35 to perform control of power-on.

In step ST5, the NFC communication unit 411 issues a command response through NFC communication in response to the detection of the NFC communication.

In step ST6, the information processing apparatus 60 finds an NFC communication party by detecting the command response from the imaging apparatus 20 and issues a check command to acquire predetermined information.

In step ST7, the NFC communication unit 411 of the imaging apparatus 20 outputs the check command received through the NFC communication to the control unit 45.

In step ST8, the control unit 45 outputs response data to the NFC communication unit 411 in response to the check command. Here, the response data includes, for example, the above-described Wi-Fi Config and AAR.

In step ST9, the NFC communication unit 411 transmits the response data to the information processing apparatus 60 through NFC communication. It should be noted that the above-described step ST6 to step ST9 may be performed a plurality of times, and a plurality of times of transmission may be performed to transmit the response data divided into a plurality of pieces.

In step ST10, the control unit 45 performs imaging preparation operation. The control unit 45 performs preparation operation so that imaging can be performed the imaging apparatus 20. Further during the preparation operation, preparation operation which makes it possible to recognize that the imaging apparatus 20 can perform imaging, may be performed. For example, the control unit 45 performs operation of making the lens project when a retractable lens is used as the optical imaging system 31, operation for outputting start-up sound, or the like. It should be noted that the imaging preparation operation may be performed after Wi-Fi connection is completed.

In step ST11, the information processing apparatus 60 starts predetermined application according to the received AAR. For example, in the predetermined application, processing of receiving the image signal of the picked up image transmitted from the imaging apparatus 20 through Wi-Fi communication and displaying the picked up image, or the like, is performed.

In step ST12, the information processing apparatus 60 requests Wi-Fi connection to the imaging apparatus 20 using the received Wi-Fi Config.

In step ST13, the Wi-Fi communication unit 413 of the imaging apparatus 20 outputs the connection request received from the information processing apparatus 60 to the control unit 45.

In step ST14, the control unit 45 performs Wi-Fi authentication. It should be noted that the Wi-Fi authentication may be performed at the Wi-Fi communication unit 413.

In step ST15, the control unit 45 outputs the authentication result to the Wi-Fi communication unit 413.

In step ST16, the Wi-Fi communication unit 413 transmits the authentication result to the information processing apparatus 60. In step ST17, the information processing apparatus 60 completes Wi-Fi connection by successful authentication. Then, the imaging apparatus 20 and the information processing apparatus 60 implement a collaboration function using Wi-Fi communication.

It should be noted that the imaging apparatus 20 and the information processing apparatus 60 only have to collaborate with each other through Wi-FI communication, or the like, and processing until the function of collaboration between the imaging apparatus and the information processing apparatus is implemented is not limited to processing in the order illustrated in FIG. 7.

[5-2. Control Operation of Mode Relating to Imaging]

Control operation of the mode relating to imaging will be described next. After the imaging apparatus 20 or the information processing apparatus 60 implements a collaboration function, the mode relating to imaging of the imaging apparatus is controlled according to posture determination information indicating at least posture of the imaging apparatus 20 in the separation state between the fixation state in which the imaging apparatus 20 and the information processing apparatus 60 are fixed to each other and the separation state in which the imaging apparatus 20 is separated from the information processing apparatus 60. Further, when it is determined that the imaging apparatus 20 and the information processing apparatus 60 are in the fixation state in which the imaging apparatus 20 and the information processing apparatus 60 are fixed to each other, processing of controlling the mode relating to imaging of the imaging apparatus according to the posture determination information is not performed. In the control of the mode relating to imaging, it is possible to select a mode according to the posture determination information from modes preset by the user. It should be noted that the modes preset by the user may be modes selected by the user from modes registered in advance upon shipment from the factory or modes uniquely set by the user. The posture determination information indicating the posture of the imaging apparatus 20 is generated at the posture determining unit 36 of the imaging apparatus 20 as described above.

[5-2-1. First Control Operation]

First control operation of the mode relating to imaging will be described next. In the first control operation, a case will be described where the mode relating to imaging is controlled according to the posture of the imaging apparatus in the case where the imaging apparatus is separated from the information processing apparatus.

When observation, monitoring, or the like, is performed using the imaging apparatus, after the collaboration function between the imaging apparatus and the information processing apparatus is implemented, if the imaging apparatus in the separation state is provided, for example, in such a manner that the imaging apparatus can pick up an image of a desired subject, it is possible to perform observation, or the like, of the subject by utilizing the information processing apparatus even from a remote location. Therefore, in the first control operation, for example, a case will be described where the mode relating to imaging in the case where the imaging apparatus is provided at predetermined posture is set to a mode corresponding to the predetermined posture.

Figure 8:
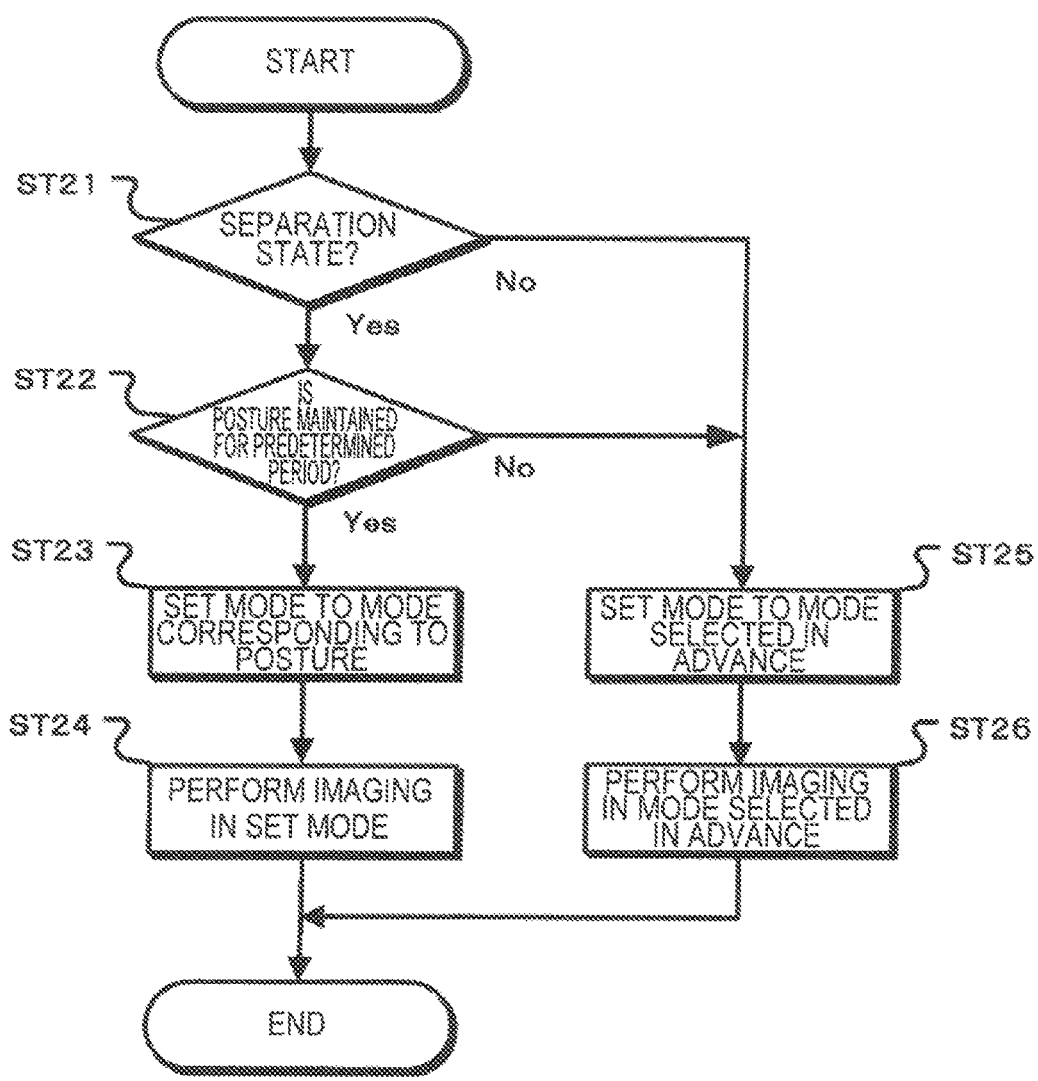
FIG. 8 is a flowchart illustrating processing in the case where first control operation is performed at a control unit of the imaging apparatus.

FIG. 8 is a flowchart illustrating processing in the case where the first control operation is performed at the control unit of the imaging apparatus.

In step ST21, the control unit 45 determines whether the imaging apparatus 20 and the information processing apparatus 60 are in the separation state. When the control unit 45 determines that the imaging apparatus 20 and the information processing apparatus 60 are in the separation state based on the fixation/separation information outputted from the fixation/separation determining unit 91, the processing proceeds to step ST22, while, when the control unit 45 determines that the state is the fixation state, the processing proceeds to step ST25.

In step ST22, the control unit 45 determines whether the posture of the imaging apparatus 20 is maintained for a predetermined period. When the control unit 45 determines that the posture of the imaging apparatus 20 is continuously maintained for the predetermined period based on the posture determination information outputted from the posture determining unit 36, the processing proceeds to step ST23, while, when the control unit 45 does not determine that the posture is continuously maintained for the predetermined period even after a determination period has elapsed, the processing proceeds to step ST25.

In step ST23, the control unit 45 sets the mode relating to imaging to the mode corresponding to the posture how the imaging apparatus 20 is held, and the processing proceeds to step ST24.

In step ST24, the control unit 45 performs imaging in the set mode. The control unit 45 performs imaging in the set mode in step ST23 and performs processing of generating a picked up image and, for example, transmitting the picked up image from the radio communication unit 41 to the information processing apparatus 60, processing of recording the picked up image in the recording medium 46 at the recording and reproducing unit 34, or the like.

When the processing proceeds from step ST21 or step ST22 to step ST25, the control unit 45 sets the mode relating to imaging to a mode selected in advance through user operation. The control unit 45 sets the mode relating to imaging to the mode selected in advance, for example, a mode selected upon completion of previous operation or a mode selected through user operation at the operation input units 44 and 78, and the processing proceeds to step ST26.

In step ST26, the control unit 45 performs imaging in a mode selected in advance. The control unit 45 performs imaging in the mode set in step ST25 and performs processing of generating a picked up image and, for example, transmitting the picked up image from the radio communication unit 41 to the information processing apparatus 60, processing of recording the picked up image in the recording medium 46 at the recording and reproducing unit 34, or the like.

Further, in the processing illustrated in FIG. 8, a case has been described where the mode is automatically set according to the posture determination result of the imaging apparatus in a state in which the imaging apparatus 20 is separated from the information processing apparatus 60. However, control of the mode relating to imaging is not limited to control in the case where the mode is automatically set, but may include control in the case where the mode transitions in response to user instruction.

Figure 9:
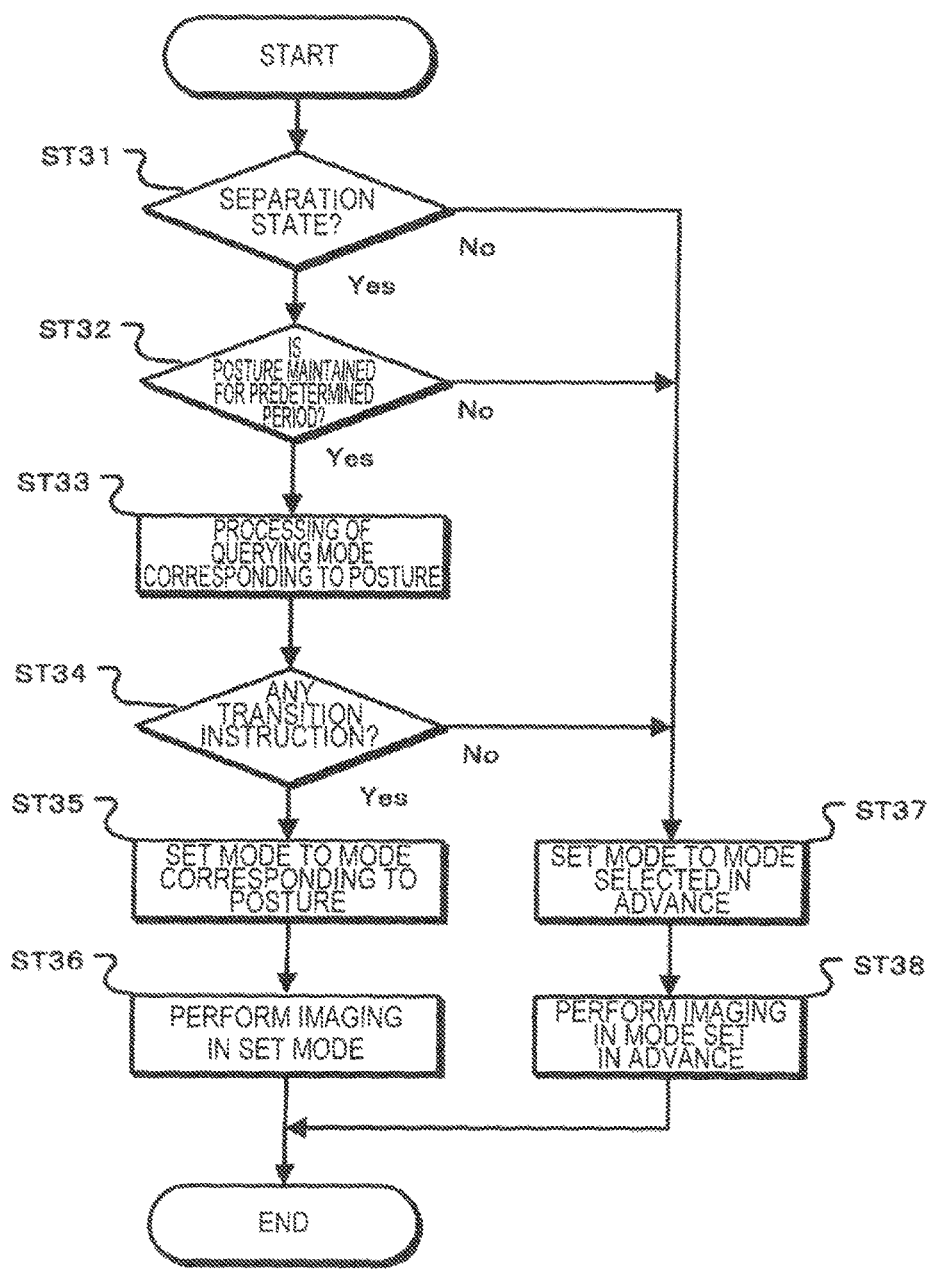
FIG. 9 is a flowchart illustrating another processing in the case where the first control operation is performed at the control unit of the imaging apparatus.

FIG. 9 is a flowchart illustrating another processing in the case where the first control operation is performed at the control unit of the imaging apparatus.

In step ST31, the control unit 45 determines whether the imaging apparatus 20 and the information processing apparatus 60 are in the separation state. When the control unit 45 determines that the imaging apparatus 20 and the information processing apparatus 60 are in the separation state based on the fixation/separation information outputted from the fixation/separation determining unit 91, the processing proceeds to step ST32, while, the control unit 45 determines that the imaging apparatus 20 and the information processing apparatus 60 are in the fixation state, the processing proceeds to step ST37.

In step ST32, the control unit 45 determines whether the posture of the imaging apparatus 20 is maintained for a predetermined period. When the control unit 45 determines that the posture of the imaging apparatus 20 is continuously maintained for the predetermined period based on the posture determination information outputted from the posture determining unit 36, the processing proceeds to step ST33, while, when the control unit does not determine that the posture is not continuously maintained for the predetermined period even after a determination period has elapsed, the processing proceeds to step ST37.

In step ST33, the control unit 45 performs processing of querying the mode corresponding to the posture. The control unit 45 transmits query information indicating that the mode relating to imaging is changed to the mode corresponding to the posture to the information processing apparatus 60 via the radio communication unit 41, and the processing proceeds to step ST34. The information processing apparatus 60 notifies the user of a request for transition allowance to the mode corresponding to the posture using, for example, the display unit 77 based on the query information from the imaging apparatus 20.

In step ST34, the control unit 45 determines whether there is a transition instruction. When the control unit 45 determines that there is a transition instruction, the processing proceeds to step ST35, while, when the control unit 45 determines that there is no transition instruction, the processing proceeds to step ST37. For example, when user operation as to whether or not the mode transitions to the mode corresponding to the posture is performed at the operation input unit 78 of the information processing apparatus 60, the control unit 85 generates operation information based on the user operation and transmits the operation information from the radio communication unit 71 to the imaging apparatus 20. When the control unit 45 of the imaging apparatus 20 determines that the operation information indicates a transition instruction, the processing proceeds to step ST35, while, when the control unit 45 determines that the operation information does not indicate a transition instruction, the processing proceeds to step ST37. It should be noted that the information processing apparatus 60 may generate operation information on the supposition that, for example, there is a transition instruction to the mode corresponding to the posture when the user operation in response to the query is not performed even after a predetermined period has elapsed since the query as to transition to the mode corresponding to the posture was sent.

In step ST35, the control unit 45 sets the mode relating to imaging to the mode corresponding to the posture of the imaging apparatus, and the processing proceeds to step ST36.

In step ST36, the control unit 45 performs imaging in the set mode. The control unit 45 performs imaging in the mode set in step ST35 and performs processing of generating a picked up image and, for example, transmitting the picked up image from the radio communication unit 41 to the information processing apparatus 60, processing of recording the picked up image in the recording medium 46 at the recording and reproducing unit 34, or the like.

When the processing proceeds from step ST31, step ST32 or step ST34 to step ST37, the control unit 45 sets the mode relating to imaging to a set selected in advance through user operation, or the like. The control unit 45 sets the mode relating to imaging to the mode selected in advance, for example, a mode selected upon completion of previous operation or a mode selected through user operation at the operation input units 44 and 78, and the processing proceeds to step ST38.

In step ST38, the control unit 45 performs imaging in a mode selected in advance. The control unit 45 performs imaging in the mode set in step ST37 and performs processing of generating a picked up image and, for example, transmitting the picked up image from the radio communication unit 41 to the information processing apparatus 60, processing of recording the picked up image in the recording medium 46 at the recording and reproducing unit 34, or the like.

In this manner, if schedule for transition to the mode according to the posture is notified according to the posture of the imaging apparatus in the case where the imaging apparatus and the information processing apparatus are in the separation state, the user can confirm the mode through this notification. Further, when the mode according to the posture is different from a mode desired by the user, by not issuing a transition instruction, it is possible to prevent the mode from being automatically set to a mode different from the desired mode.

Further, mode control operation can be performed at the control unit 85 of the information processing apparatus 60. For example, when the control unit 85 determines that the imaging apparatus 20 and the information processing apparatus 60 are in the separation state based on the fixation/separation information outputted from the fixation/separation determining unit 91, the control unit 85 determines whether the imaging apparatus 20 is continuously held at predetermined posture based on the posture determination information acquired from the imaging apparatus 20. When the control unit 85 determines that the imaging apparatus 20 is continuously held for the predetermined period at the predetermined posture, the control unit 85 gives a setting instruction to set the mode to the mode corresponding to the predetermined posture and sets the mode relating to imaging to a mode indicated in the setting instruction. By performing such processing, it is possible to set the mode relating to imaging of the imaging apparatus 20 to the mode according to the posture of the imaging apparatus 20 at the control unit 85 of the information processing apparatus 60.

Figure 10:
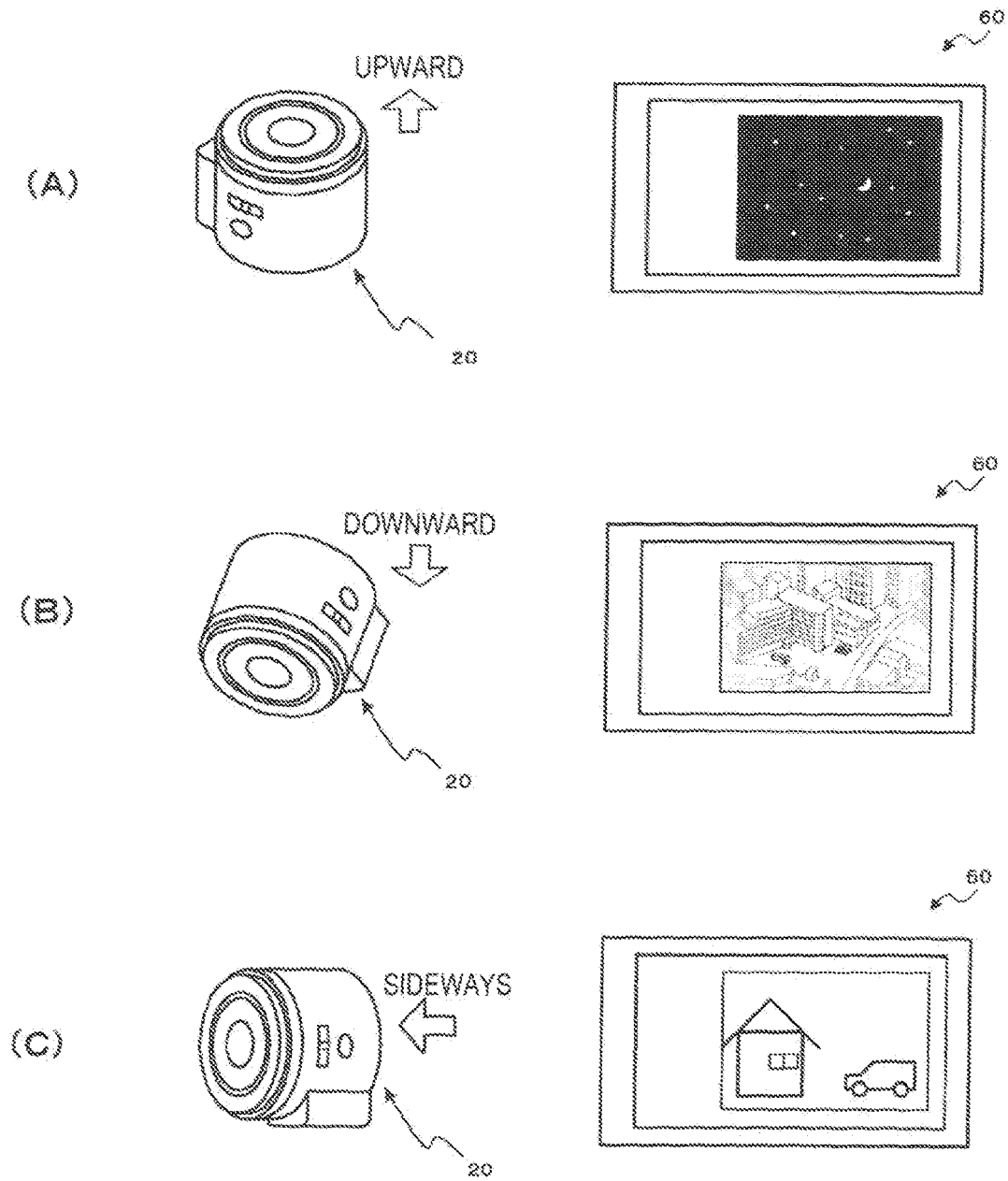
FIG. 10 is a diagram for explaining relationship between posture of the imaging apparatus and a mode relating to imaging.

FIG. 10 is a diagram for explaining relationship between the posture of the imaging apparatus and the mode relating to imaging. When the posture of the imaging apparatus is upward, for example, as illustrated in FIG. 10(A), the control unit 45 sets the mode to a mode appropriate for imaging night sky (hereinafter, referred to as a "night sky mode"). Further, when the posture of the imaging apparatus is downward, for example, as illustrated in FIG. 10(B), the control unit 45 sets the mode to a mode in which a picked up image is obtained by performing imaging while looking down the panorama of the city, or the like, so that the picked up image looks as if the city were configured with a miniature model (hereinafter, referred to as a "miniature mode"). Further, when the imaging apparatus is placed sideways, for example, as illustrated in FIG. 10(C), it is also possible to set the mode to a mode in which the imaging apparatus is made to operate as a monitoring camera (hereinafter, referred to as a "monitoring mode").

In the night sky mode, the zoom position is moved to a wide angle side, for example, a wide angle side end portion so that an image of a broader range of the sky can be picked up. Further, because the night sky mode is a mode for imaging starry sky, for example, shutter speed, diaphragm, or the like, is controlled so that a beautiful image of the starry light can be picked up. Further, in the night sky mode, interval imaging is performed so that movement of stars, or the like, can be tracked.

In the miniature mode, the zoom position is moved to a wide angle side, for example, a wide angle side end portion so that an image of a broader range of the city, or the like, can be picked up. Further, in the miniature mode, the image processing unit 33 performs processing so that a subject is displayed as if it were a model by adjusting contrast, color, or the like.

In the monitoring mode, the zoom position is moved so that an image of a monitoring target range can be picked up. Further, in the monitoring mode, interval imaging is performed, so that a monitoring image of a long period can be recorded.

Further, the mode relating to imaging may be set while taking into account a holding aspect of the imaging apparatus, that is, how the imaging apparatus is held. In this case, a holding aspect detecting unit configured to detect the holding aspect is provided at the imaging apparatus, and the mode relating to imaging is set according to the posture of the imaging apparatus and the detected holding aspect. For example, when the holding aspect detecting unit detects that the imaging apparatus 20 is attached to a tripod, and when the imaging apparatus is held upward, the mode is set to the night sky mode, while, when the imaging apparatus is held downward, the mode is set to the miniature mode, a macro mode, or the like. Further, when the imaging apparatus 20 is attached to a ceiling-mounted adapter and held downward, the mode is set to the monitoring mode. Still further, when the imaging apparatus 20 is attached to a wall-mounted adapter and held sideways, the mode is set to the monitoring mode, and, when the imaging apparatus 20 is attached to a vehicle-mounted adapter and held sideways, the mode is set to a vehicle mode, or the like, appropriate for performing imaging from a vehicle. When the mode is set to, for example, the vehicle mode, the imaging apparatus generates a moving image by setting an angle of view, or the like, so that an image of a predetermined range outside the vehicle in a travelling direction can be picked up. Further, the imaging apparatus may adjust a frame rate of a moving image to be generated, a compression rate in coding processing, or the like, to suppress a data amount of image information.

It should be noted that the mode set according to the posture of the imaging apparatus, or the mode set according to the posture of the imaging apparatus and the holding aspect may be selected from modes preset by the user according to the posture determination information and the holding aspect. Further, the modes preset by the user may be modes selected by the user from modes registered in advance upon shipment from the factory or modes uniquely set by the user.

In this manner, in first operation, when the imaging apparatus 20 and the information processing apparatus 60 are in the separation state, the mode relating to imaging is set to the mode according to the posture of the imaging apparatus 20. Therefore, the user does not have to perform operation of setting the mode relating to imaging and can easily set the mode to a desired mode. Further, by setting the mode relating to imaging while taking into account the holding aspect of the imaging apparatus, it is possible to easily set the mode to a mode according to the holding aspect even when the imaging apparatus takes the same posture.

Further, when the user is notified of schedule for transition to the mode according to the posture according to the posture of the imaging apparatus in the case where the imaging apparatus and the information processing apparatus are in the separation state, the user can confirm a mode to which the mode is scheduled to transition through this notification. Therefore, by not issuing a transition instruction, it is possible to prevent the mode relating to imaging from being automatically set to a mode different from a mode desired by the user.

[5-2-2. Second Control Operation]

Second control operation of the mode relating to imaging will be described next. In the second control operation, a case will be described where the mode relating to imaging is controlled according to relative relationship of the posture between the imaging apparatus and the information processing apparatus when the imaging apparatus and the information processing apparatus are in the separation state.

When the imaging direction of the imaging apparatus 20 is similar to the display direction of the picked up image at the information processing apparatus 60, in order to move the imaging range of the picked up image displayed at the information processing apparatus 60 in, for example, a right direction, the user has to move the imaging apparatus 20 or the imaging direction of the imaging apparatus 20 in a left direction. For example, when the user picks up an image of him/herself using the imaging apparatus 20 and confirms a live view image at the display unit of the information processing apparatus 60, when the position of the user is moved in, for example, a right direction at the display image, the user has to move the imaging apparatus 20 or the imaging direction of the imaging apparatus 20 in a left direction. Therefore, when the imaging apparatus is integrally held on the front side of the information processing apparatus 60, the imaging system shifts the mode relating to imaging to a self-capturing mode in which the picked up image which is mirror-reversed is displayed. In this manner, in the self-capturing mode, because the picked up image which is mirror-reversed is displayed, a direction of movement of the imaging range of the picked up image displayed at the information processing apparatus 60 is the same as a direction of movement of the imaging apparatus 20 or the imaging direction of the imaging apparatus 20 (hereinafter, referred to as "movement of the imaging apparatus 20, or the like").

When the mode relating to imaging is set to the self-capturing mode according to the posture relationship between the imaging apparatus and the information processing apparatus, for example, respective orientations are detected based on direction sensors, or the like, provided at the posture determining unit 36 of the imaging apparatus 20 and the sensor unit 76 of the information processing apparatus 60. When the imaging direction is similar to the display direction, the imaging apparatus or the information processing apparatus sets the mode relating to imaging to the self-capturing mode. Further, it is also possible to perform communication while narrowing directivity of a detection reference signal for detecting the posture upon transmission or reception and set the mode to the self-capturing mode based on the communication result. For example, when a posture reference signal transmitted from a front side of the imaging apparatus is received at a back side of the information processing apparatus, or when a posture reference signal transmitted from the back side of the information processing apparatus is received at the front side of the imaging apparatus, the imaging apparatus and the information processing apparatus have predetermined positional relationship. Therefore, in this case, the imaging apparatus or the information processing apparatus sets the mode relating to imaging to the self-capturing mode. Further, when it is detected that the imaging direction is similar to the display direction using another method, the imaging apparatus or the information processing apparatus may set the mode relating to imaging to the self-capturing mode.

Figure 11:
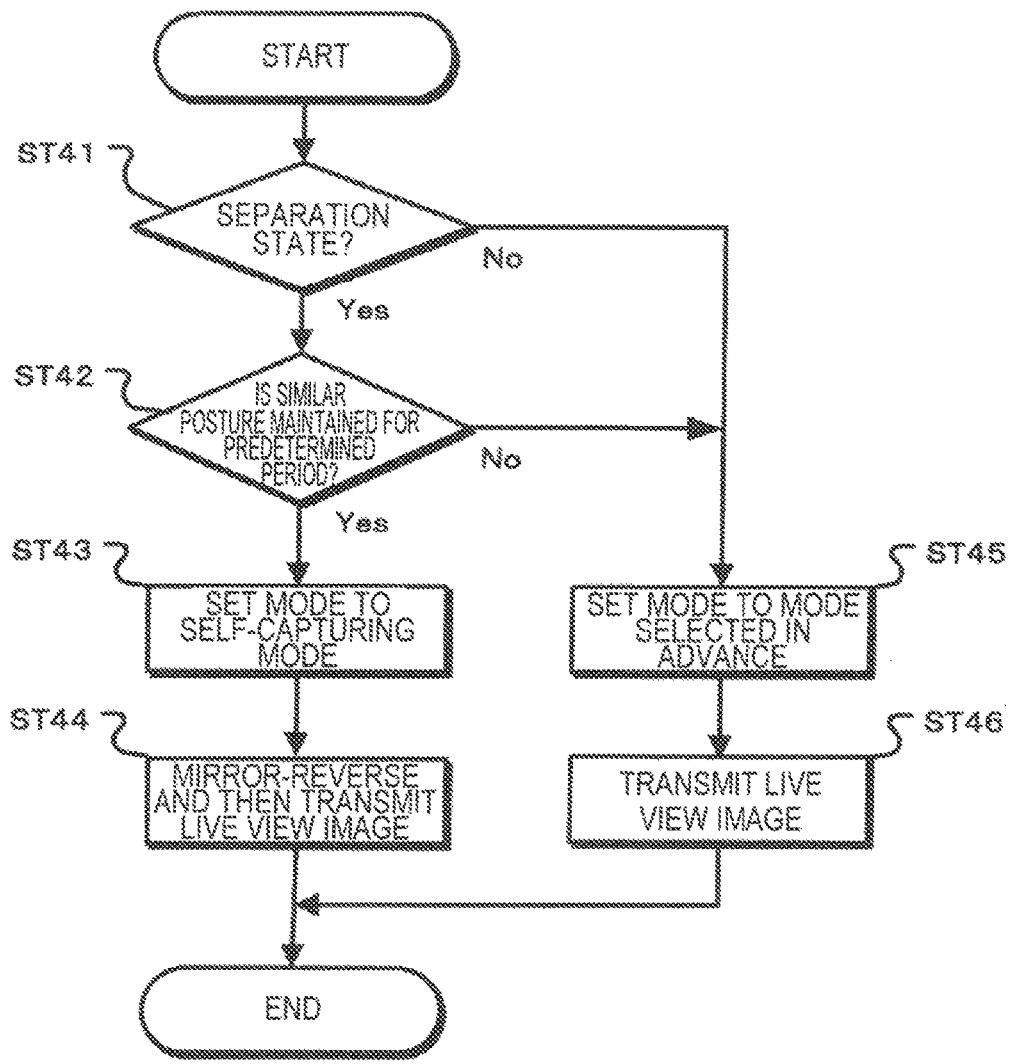
FIG. 11 is a flowchart illustrating processing in the case where second control operation is performed at the control unit of the imaging apparatus.

FIG. 11 is a flowchart illustrating processing in the case where the second control operation is performed at the control unit of the imaging apparatus.

In step ST41, the control unit 45 determines whether the imaging apparatus 20 and the information processing apparatus 60 are in the separation state. When the control unit 45 determines that the imaging apparatus 20 and the information processing apparatus 60 are in the separation state based on the fixation/separation information outputted from the fixation/separation determining unit 91, the processing proceeds to step ST42, while, when the control unit 45 determines that the imaging apparatus 20 and the information processing apparatus 60 are in the fixation state, the processing proceeds to step ST45.

In step ST42, the control unit 45 determines whether the similar posture is maintained for a predetermined period. When the control unit 45 determines that the posture of the imaging apparatus 20 and the information processing apparatus are continuously maintained at the posture in which the imaging direction of the imaging apparatus 20 becomes similar to the image display direction of the information processing apparatus 60 for the predetermined period, the processing proceeds to step ST43. Further, when the control unit 45 does not determine that the posture is continuously maintained for the predetermined period even after the determination period has elapsed, the processing proceeds to step ST45.

In step ST43, the control unit 45 sets the mode relating to imaging to the self-capturing mode. In the self-capturing mode which is a mode for picking up an image of the user him/herself, the subject is in the proximity of the imaging apparatus. Therefore, for example, when the zoom position is at a telephoto side, an image of only part of the face is picked up, and it is difficult to confirm the whole. Therefore, the control unit 45 moves the zoom position to a wide angle side, for example, a wide angle side end portion when the mode is set at the self-capturing mode. Further, because, the self-capturing mode is a mode for picking up an image of the user him/herself, the control unit 45 performs control appropriate for imaging of a person. Still further, the control unit 45 controls the image processing unit 33 to perform image processing so that, for example, the skin looks beautiful. The control unit 45 sets the mode relating to imaging to the self-capturing mode, and the processing proceeds to step ST44.

In step ST44, the control unit 45 mirror-reverses the live view image and transmits the mirror-reversed live view image. In the case of the self-capturing mode, the imaging direction of the imaging apparatus 20 is similar to the direction the picked up image is displayed at the information processing apparatus 60. Therefore, the control unit 45 mirror-reverses the live view image so that movement of an imaging range of the picked up image displayed at the information processing apparatus 60 is in the same direction as that of movement of the imaging apparatus 20, and transmits the mirror-reversed live view image from the radio communication unit 41 to the information processing apparatus 60.

When the processing proceeds from step ST41 or step ST42 to step ST45, the control unit 45 sets the mode relating to imaging to a set selected in advance through user operation. The control unit 45 sets the mode relating to image to the mode selected in advance, for example, a mode selected upon completion of previous operation or a mode selected through user operation at the operation input units 44 and 78, and the processing proceeds to step ST46.

In step ST46, the control unit 45 transmits a live view image. The control unit 45 transmits the live view image from the radio communication unit 41 to the information processing apparatus 60 without mirror-reversing the image. It should be noted that when the recording and reproducing unit 34 of the imaging apparatus 20 records a picked up image in the recording medium 46, and when the recording and reproducing unit 74 of the information processing apparatus 60 records a picked up image in the recording medium 86, the recording and reproducing units 34 and 74 record images which are not mirror-reversed.

Further, in the processing illustrated in FIG. 11, a case will be described where the mode is automatically set according to the posture determination result of the imaging apparatus in a state in which the imaging apparatus 20 is separated from the information processing apparatus 60. However, control of the mode relating to imaging is not limited to control in the case where the mode is automatically set, but may include control in which the mode transitions in response to user transition instruction.

Figure 12:
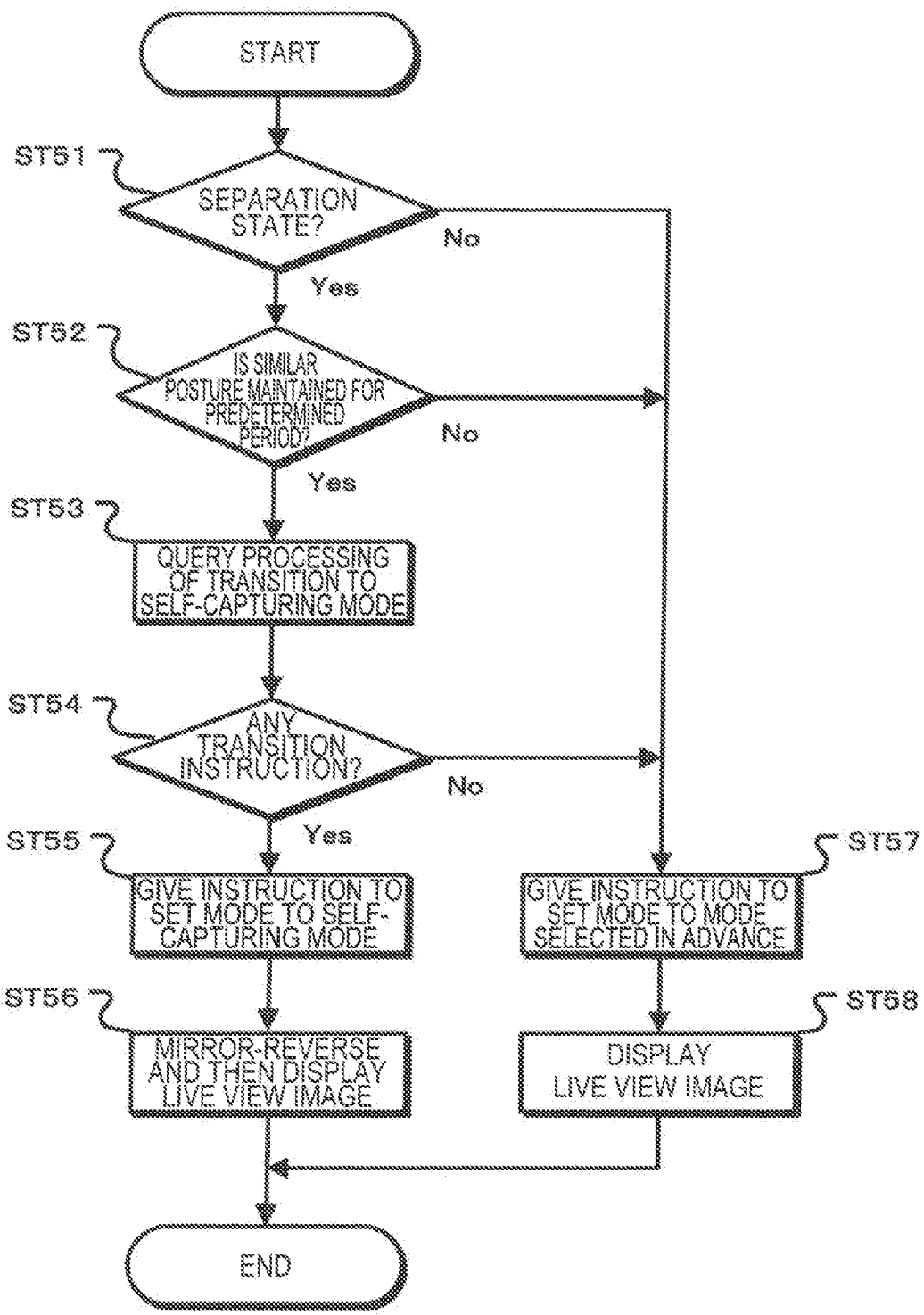
FIG. 12 is a flowchart illustrating another processing in the case where the second control operation is performed at the control unit of the imaging apparatus.

FIG. 12 is a flowchart illustrating another processing in the case where the second control operation is performed at the control unit of the imaging apparatus.

In step ST51, the control unit 45 determines whether the imaging apparatus 20 and the information processing apparatus 60 are in the separation state. When the control unit 45 determines that the imaging apparatus 20 and the information processing apparatus 60 are in the separation state based on the fixation/separation information outputted from the fixation/separation determining unit 91, the processing proceeds to step ST52, while, when the control unit 45 determines that the imaging apparatus 20 and the information processing apparatus 60 are in the fixation state, the processing proceeds to step ST57.

In step ST52, the control unit 45 determines whether the similar posture is maintained for a predetermined period. When the control unit 45 determines that the posture of the imaging apparatus 20 and the information processing apparatus 60 is continuously maintained for a predetermined period at the posture in which the imaging direction of the imaging apparatus 20 becomes similar to the display direction of the information processing apparatus 60, the processing proceeds to step ST53. Further, when the control unit 45 does not determine that the similar posture is continuously maintained for the predetermined period even after the determination period has elapsed, the processing proceeds to step ST57.

In step ST53, the control unit 45 performs processing of sending a query as to transition to the self-capturing mode. The control unit 45 transmits query information indicating that the mode relating to imaging transitions to the self-capturing mode to the information processing apparatus 60 via the radio communication unit 41, and, processing proceeds to step ST54. The information processing apparatus 60 notifies the user of a request for transition allowance to the self-capturing mode using, for example, the display unit 77 based on the query information from the imaging apparatus 20.

In step ST54, the control unit 45 determines whether there is a transition instruction, when the control unit 45 determines that there is a transition instruction, the processing proceeds to step ST55, while, when the control unit 45 determines that there is no transition instruction, the processing proceeds to step ST57. For example, when user operation as to whether or not the mode transitions to the self-capturing mode is performed at the operation input unit 78 of the information processing apparatus 60, the control unit 85 generates operation information based on the user operation and transmits the operation information from the radio communication unit 71 to the imaging apparatus 20. When the control unit 45 of the imaging apparatus 20 determines that the operation information indicates the transition instruction, the processing proceeds to step ST55, while, when the control unit 45 determines that the operation information does not indicate the transition instruction, the processing proceeds to step ST57. It should be noted that, when user operation is not performed in response to the query even after a predetermined period has elapsed since the query as to the transition to the self-capturing mode was sent, for example, the information processing apparatus 60 may generate the operation information on the supposition that the transaction instruction to transition to the self-capturing mode is issued. Further, when there is no response from the information processing apparatus 60 even after a predetermined period has elapsed since the query as to the transition to the self-capturing mode was sent, the control unit 45 of the imaging apparatus 20 may make the mode relating to imaging transition to the self-capturing mode.

In step ST55, the control unit 45 sets the mode relating to imaging to the self-capturing mode, and, the processing proceeds to step ST56.

In step ST56, the control unit 45 mirror-reverses the live view image and transmits the mirror-reversed live view image. In the case of the self-capturing mode, the imaging direction of the imaging apparatus 20 is similar to the direction the picked up image is displayed at the information processing apparatus 60. Therefore, the control unit 45 mirror-reverses the live view image so that movement of an imaging range of the picked up image displayed at the information processing apparatus 60 is in the same direction as that of movement of the imaging apparatus 20, and transmits the mirror-reversed live view image from the radio communication unit 41 to the information processing apparatus 60.

When the processing proceeds from step ST51, step ST52 or step ST54 to step ST57, the control unit 45 sets the mode relating to imaging to a mode selected in advance through user operation, or the like. The control unit 45 sets the mode relating to imaging to the mode selected in advance, for example, a mode selected upon completion of previous operation or a mode selected through user operation at the operation input units 44 and 78, and the processing proceeds to step ST58.

In step ST58, the control unit 45 transmits the live view image. The control unit 45 transmits the live view image from the radio communication unit 41 to the information processing apparatus 60 without mirror-reversing the image.

In this manner, by notifying the user of transition allowance to the mode according to the posture according to the posture of the imaging apparatus in the case where the imaging apparatus and the information processing apparatus are in the separation state, the user can confirm the mode through this notification. Further, when the mode according to the posture is different from the mode desired by the user, by not issuing a transition instruction, it is possible to prevent a mode different from the desired mode from being automatically set.

Further, the mode control operation can be performed at the control unit 85 of the information processing apparatus 60. For example, when the control unit 85 determines that the imaging apparatus 20 and the information processing apparatus 60 are in the separation state based on the fixation/separation information outputted from the fixation/separation determining unit 91, the control unit 85 determines whether the imaging apparatus 20 is continuously held at predetermined posture for a predetermined period based on the posture determination information acquired from the imaging apparatus 20. When the control unit 85 determines that the imaging apparatus 20 is continuously held at the predetermined posture for the predetermined period, the control unit 85 issues a setting instruction to set the mode to a mode corresponding to the predetermined posture, and the imaging apparatus 20 sets the mode relating to imaging to the mode indicated in the setting instruction. By performing such processing, it is possible to set the mode relating to imaging of the imaging apparatus 20 to the mode according to the posture of the imaging apparatus 20 at the control unit 85 of the information processing apparatus 60.

Figure 13:
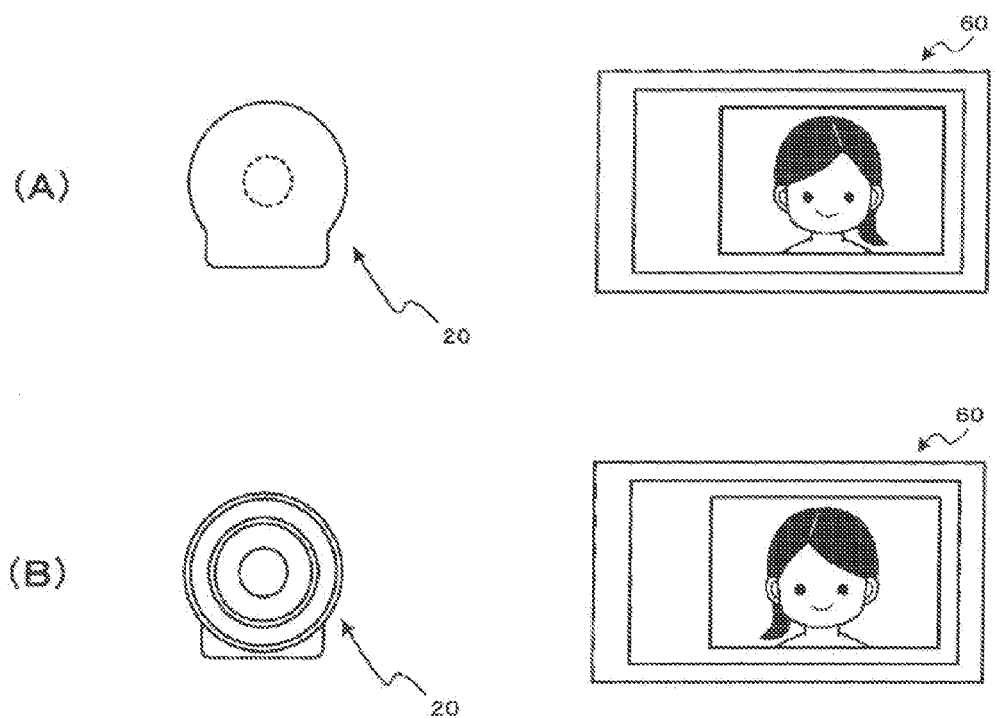
FIG. 13 is a diagram illustrating the second control operation.

In this manner, in the second operation, when the imaging apparatus 20 and the information processing apparatus 60 are in the separation state, and the imaging direction is similar to the display direction of the picked up image, the mode relating to imaging is set to the self-capturing mode. Therefore, as illustrated in FIG. 13, the user can easily set the mode relating to imaging of the imaging apparatus to the self-capturing mode only by making the imaging direction similar to the display direction of the picked up image without performing operation for setting the mode relating to imaging.

Incidentally, a series of the processes described in the present specification can be executed by hardware, software, or a combination of both. The software can execute the processes by installing a program recording a processing sequence into a memory in a computer integrated with dedicated hardware, or by installing the program in a general purpose computer executable of various processes. For example, the program can previously be recorded in a hard disk drive. SSD (Solid State Drive), or ROM (Read Only Memory) as a recording medium. Or the program can temporarily or permanently be stored (recorded) in a removable medium such as a flexible disk, CD-ROM (Compact Disc Read Only Memory), MO (Magneto optical) disk, DVD (Digital Versatile Disc), BD (Blu-Ray Disc®), magnetic disk, semiconductor memory card. Such a removable recording medium can be provided as so-called packaged software.

Moreover, the program not only be installed in the computer form the removable recording medium but also may be installed by wireless or wired transferring into the computer via a network such as a LAN (Local Area Network) and the Internet from download sites. The computer can undergo installation of the received program, which is transferred like that, into the recording medium such as the mounted hard disk drive.

It should be understood by those skilled in the art that various modifications, combinations, sub-combinations and alterations may occur depending on design requirements and other factors insofar as they are within the scope of the appended claims or the equivalents thereof.

Additionally, the imaging system according to the present technology may also be configured as below.

(1)

An imaging system including:

a control unit configured to control a mode relating to imaging of an imaging apparatus according to posture determination information indicating at least posture of the imaging apparatus in a separation state between a fixation state in which the imaging apparatus and an information processing apparatus are fixed to each other and the separation state in which the imaging apparatus is separated from the information processing apparatus.

(2)

The imaging system according to (1), including:

a posture determining unit configured to determine the posture of the imaging apparatus to output the posture determination information.

(3)

The imaging system according to (1) or (2), wherein, when it is determined that the posture is continuously maintained for a predetermined period based on the posture determination information, the control unit controls the mode relating to imaging of the imaging apparatus according to the posture determination information.

(4)

The imaging system according to any of (1) to (3), further including:

a fixation/separation determining unit configured to determine whether the imaging apparatus and the information processing apparatus are in the fixation state or the separation state.

(5)

The imaging system according to (4), wherein, when the fixation/separation determining unit determines that the imaging apparatus and the information processing apparatus are in the fixation state, the control unit does not perform control of the mode relating to imaging of the imaging apparatus according to the posture determination information.

(6)

The imaging system according to any of (1) to (5), wherein, when the posture determination information indicates that an imaging direction is upward, the control unit controls the mode relating to imaging of the imaging apparatus to a mode appropriate for imaging night sky.

(7)

The imaging system according to any of (1) to (6), wherein, when the posture determination information indicates that an imaging direction is downward, the control unit controls the mode relating to imaging of the imaging apparatus to a miniature mode.

(8)

The imaging system according to any of (1) to (7), wherein, when the posture determination information indicates that an imaging direction is a direction of a user him/herself, the control unit controls the mode relating to imaging of the imaging apparatus to a self-capturing mode.

(9)

The imaging system according to (8), wherein the control unit displays a mirror-reversed picked up image at a display unit in the self-capturing mode.

(10)

The imaging system according to any of (1) to (9), wherein the control unit controls the mode relating to imaging of the imaging apparatus according to the posture determination information and a holding aspect of the imaging apparatus which is put into the separation state.

(11)

The imaging system according to any of (1) to (10), wherein communication is performed between the imaging apparatus and the information processing apparatus, and a picked up image obtained at the imaging apparatus is displayed at the information processing apparatus.

(12)

The imaging system according to any of (1) to (11), wherein in control of the mode relating to imaging, a mode preset by a user is selected according to the posture determination information.

INDUSTRIAL APPLICABILITY

In the present technology, the mode relating to imaging of the imaging apparatus is controlled according to the posture determination information indicating at least the posture of the imaging apparatus in a separation state between a fixation state in which the imaging apparatus and the information processing apparatus are fixed to each other and the separation state in which the imaging apparatus is separated from the information processing apparatus. Therefore, because the mode is set according to the posture determination information indicating at least the posture of the imaging apparatus in the separation state without performing troublesome operation for setting the mode at the imaging apparatus or the information processing apparatus, it is possible to easily set the mode relating to imaging. Accordingly, the present technology is suitable for an imaging system in which the imaging apparatus which does not have a display function can be fixed to or separated from the information processing apparatus such as a smartphone, and, for example, the picked up image generated at the imaging apparatus can be confirmed at the information processing apparatus through communication between the imaging apparatus and the information processing apparatus.

REFERENCE SIGNS LIST 10 imaging system
15 control unit
20 imaging apparatus
21 cylindrical portion
22 control ring
31 optical imaging system
32 imaging unit
33 image processing unit
34, 74 recording and reproducing unit
35, 75 power supply unit
36 posture determining unit
37, 73 storage unit
38, 77 display unit
41, 71 radio communication unit
44, 78 operation input unit
45, 85 control unit
46, 86 recording medium
50 attachment mechanism portion
51, 52 attachment member
60 information processing apparatus
61 chassis
62 display panel
72 sound input/output unit
76 sensor unit
91 fixation/separation determining unit
441 zoom button
442 shutter button

The invention claimed is:

1. An imaging system, comprising:
an imaging apparatus that comprises first circuitry; and
an information processing apparatus that comprises second circuitry configured to:
  receive posture determination information that indicates a posture of the imaging apparatus in a separation state, wherein the imaging apparatus is separate from the information processing apparatus in the separation state;
  transmit a setting instruction that sets an imaging mode from a plurality of imaging modes of the imaging apparatus, wherein the transmission of the setting instruction is based on the received posture determination information,
  wherein the imaging mode corresponds to the posture of the imaging apparatus, and wherein each of the plurality of imaging modes corresponds to a different posture of the imaging apparatus, and
wherein the first circuitry is configured to:
  transmit the posture determination information to the information processing apparatus;
  receive the setting instruction;
  set the imaging mode based on the received setting instruction; and
  capture an image based on the set imaging mode.

2. The imaging system according to claim 1, wherein the imaging apparatus further comprises at least one of a triaxial acceleration sensor, a gyro sensor or an inclination sensor configured to determine the posture of the imaging apparatus and generate the posture determination information based on the determined posture.

3. The imaging system according to claim 1,
wherein the first circuitry is further configured to determine a time period in which the imaging apparatus is in the posture, and
wherein the second circuitry is further configured to control the imaging mode of the imaging apparatus, based on the time period that exceeds a threshold time period.

4. The imaging system according to claim 1,
wherein the second circuitry is further configured to determine that the imaging apparatus and the information processing apparatus are in one of a fixation state or the separation state, and
wherein the imaging apparatus is fixed to the information processing apparatus in the fixation state.

5. The imaging system according to claim 4, wherein the second circuitry is further configured to set a default imaging mode of the plurality of imaging modes of the imaging apparatus based on the determination that the imaging apparatus and the information processing apparatus are in the fixation state.

6. The imaging system according to claim 1, wherein the second circuitry is further configured to set the imaging mode of the imaging apparatus as a night sky capture mode based on the posture determination information that indicates a first imaging direction of the imaging apparatus.

7. The imaging system according to claim 1, wherein the second circuitry is further configured to set the imaging mode of the imaging apparatus as a miniature mode based on the posture determination information that indicates a second imaging direction of the imaging apparatus.

8. The imaging system according to claim 1, wherein, the second circuitry is further configured to set the imaging mode of the imaging apparatus as a self-capturing mode based on the posture determination information that indicates a user's direction as a third imaging direction of the imaging apparatus.

9. The imaging system according to claim 8,
wherein the first circuitry is further configured to capture a mirror-reversed image in the self-capturing mode, and
wherein the information processing apparatus further comprises a display screen configured to display the mirror-reversed image.

10. The imaging system according to claim 1, wherein the second circuitry is further configured to control the imaging mode of the imaging apparatus based on the posture determination information and a holding aspect of the imaging apparatus.

11. The imaging system according to claim 1,
wherein the second circuitry is further configured to obtain the image from the imaging apparatus, and
wherein the information processing apparatus further comprises a display screen configured to display the image.

12. The imaging system according to claim 1, wherein the imaging mode is a user set mode.

13. An imaging control method, comprising:
transmitting, by an imaging apparatus, posture determination information indicating a posture of the imaging apparatus in a separation state, wherein the imaging apparatus is separate from an information processing apparatus in the separation state;

receiving, by the information processing apparatus, the posture determination information from the imaging apparatus;

transmitting, by the information processing apparatus, a setting instruction that sets an imaging mode from a plurality of imaging modes of the imaging apparatus, wherein the transmission of the setting instruction is based on the received posture determination information, wherein the imaging mode corresponds to the posture of the imaging apparatus, and wherein each of the plurality of imaging modes corresponds to a different posture of the imaging apparatus;

receiving, by the imaging apparatus, the setting instruction;

setting, by the imaging apparatus, the imaging mode based on the received setting instruction; and capturing, by the imaging apparatus an image based on the set imaging mode.

14. A non-transitory computer-readable medium having stored thereon, computer-readable instructions that, when executed by a computer, cause the computer to execute operations, the operations comprising:

transmitting a setting instruction that sets an imaging mode from a plurality of imaging modes of an imaging apparatus, wherein the transmission of the setting instruction is based on posture determination information indicating a posture of the imaging apparatus in a separation state, wherein the imaging apparatus is separate from an information processing apparatus in the separation state, wherein the imaging mode of the imaging apparatus corresponds to the posture of the imaging apparatus, and wherein each of the plurality of imaging modes corresponds to a different posture of the imaging apparatus; and obtaining an image based on the imaging mode.

15. An imaging apparatus, comprising:

circuitry configured to:

set an imaging mode from a plurality of imaging modes of the imaging apparatus based on posture determination information that indicates a posture of the imaging apparatus in a separation state, wherein the imaging apparatus is separate from an information processing apparatus in the separation state, wherein the set imaging mode of the imaging apparatus corresponds to the posture of the imaging apparatus, and wherein each of the plurality of imaging modes corresponds to a different posture of the imaging apparatus; and capture an image based on the set imaging mode.

16. The imaging apparatus according to claim 15, wherein the circuitry is further configured to determine that the imaging apparatus and the information processing apparatus are in one of a fixation state or the separation state, and wherein the imaging apparatus is fixed to the information processing apparatus in the fixation state.

17. The imaging apparatus according to claim 15, wherein the circuitry is further configured to:

communicate with the information processing apparatus; and transmit the image to the information processing apparatus.

18. The imaging apparatus according to claim 15, further comprising at least one of a triaxial acceleration sensor, a gyro sensor or an inclination sensor configured to generate the posture determination information, wherein the circuitry is further configured to transmit the generated posture determination information to the information processing apparatus.

19. An information processing apparatus, comprising:

circuitry configured to:

communicate with an imaging apparatus;

transmit a setting instruction that sets an imaging mode from a plurality of imaging modes of the imaging apparatus, wherein the transmission of the setting instruction is based on posture determination information that indicates a posture of the imaging apparatus in a separation state, wherein the information processing apparatus is separate from the imaging apparatus in the separation state, wherein the imaging mode of the imaging apparatus corresponds to the posture of the imaging apparatus, and wherein each of the plurality of imaging modes corresponds to a different posture of the imaging apparatus; and obtain an image from the imaging apparatus, wherein the imaging apparatus captures the image based on the imaging mode.

20. The information processing apparatus according to claim 19, further comprising a display screen, wherein the circuitry is further configured to control the display screen to display the image.

21. The information processing apparatus according to claim 20, wherein the circuitry is further configured to control the display screen to display the image, based on the posture of the imaging apparatus.

* * * * *